(12) United States Patent
Labreuche

(10) Patent No.: US 7,236,964 B2
(45) Date of Patent: Jun. 26, 2007

(54) METHOD OF EXPLAINING A DECISION TAKEN BY A COMPENSATORY MULTI-CRITERIA AGGREGATION MODEL

(75) Inventor: Christophe Labreuche, Orsay (FR)

(73) Assignee: Thales, Neuilly-sur Seine (FR)

( * ) Notice: Subject to any disclaimer, the term of this patent is extended or adjusted under 35 U.S.C. 154(b) by 0 days.

(21) Appl. No.: 10/536,427

(22) PCT Filed: Nov. 24, 2003

(86) PCT No.: PCT/EP03/50879

§ 371 (c)(1),
(2), (4) Date: May 26, 2005

(87) PCT Pub. No.: WO2004/051562

PCT Pub. Date: Jun. 17, 2004

(65) Prior Publication Data

US 2006/0047613 A1    Mar. 2, 2006

(30) Foreign Application Priority Data

Nov. 29, 2002 (FR) .................................. 02 15064

(51) Int. Cl.
*G06N 5/00* (2006.01)
*G06N 5/02* (2006.01)
*G06N 5/04* (2006.01)
(52) U.S. Cl. .............................. 706/46; 706/45; 706/53
(58) Field of Classification Search ................. 706/46, 706/52, 53

See application file for complete search history.

(56) References Cited

U.S. PATENT DOCUMENTS

| | | | | |
|---|---|---|---|---|
| 5,717,865 A * | 2/1998 | Stratmann | ..................... | 705/10 |
| 5,832,465 A * | 11/1998 | Tom | ............................ | 706/51 |
| 5,983,220 A * | 11/1999 | Schmitt | ......................... | 707/5 |
| 5,995,728 A * | 11/1999 | Forman | ......................... | 703/2 |
| 6,304,833 B1 * | 10/2001 | Ferkinhoff et al. | ............. | 703/2 |
| 6,463,431 B1 * | 10/2002 | Schmitt | ......................... | 707/5 |
| 6,697,799 B1 * | 2/2004 | Neal et al. | ..................... | 707/3 |
| 6,751,600 B1 * | 6/2004 | Wolin | .......................... | 706/12 |
| 6,826,541 B1 * | 11/2004 | Johnston et al. | .......... | 705/36 R |
| 6,826,552 B1 * | 11/2004 | Grosser et al. | ............... | 706/47 |
| 6,951,008 B2 * | 9/2005 | Quaile | .......................... | 706/54 |
| 6,957,202 B2 * | 10/2005 | Skaanning et al. | ........... | 706/20 |
| 2003/0078900 A1 * | 4/2003 | Dool | ............................ | 706/18 |

* cited by examiner

*Primary Examiner*—Anthony Knight
*Assistant Examiner*—Adrian L. Kennedy
(74) *Attorney, Agent, or Firm*—Lowe Hauptman & Berner, LLP

(57) ABSTRACT

The method in accordance with the invention is a method making it possible to explain a decision taken by a compensatory multi-criterion aggregation model, according to which a single compensatory multi-criterion aggregation model is established for the application considered, described by a certain number of phenomena and reproducing a determined expert opinion, and it is characterized in that no reference is made in the explanation to the specificities of the aggregation model if the decision taken had been the same on replacing the aggregation model by any other close model, that, if such is not the ease, the aggregation model is simplified by taking into account fewer and fewer phenomena as long as the decision taken remains the same, and that an explanation based solely on the compensation phenomena present in the simplest model previously determined is returned to the expert.

12 Claims, 2 Drawing Sheets

METHOD OF EXPLAINING A DECISION TAKEN BY A COMPENSATORY MULTI-CRITERIA AGGREGATION MODEL

CROSS-REFERENCE TO RELATED APPLICATIONS

The present Application is based on International Application No. PCT/EP2003/050879, filed on Nov. 24, 2003, which in turn corresponds to FR 02/15064 filed on Nov. 29, 2002, and priority is hereby claimed under 35 USC §119 based on these applications. Each of these applications are hereby incorporated by reference in their entirety into the present application.

FIELD OF THE INVENTION

The present invention pertains to a method of explaining a decision taken by a compensatory multi-criterion aggregation model.

DESCRIPTION OF RELATED ART

Decision aid tools or procedures rely on mathematical models making it possible to represent the knowledge of experts or decision makers. In the global decision aid process, the decisional model is determined by interviewing the experts, then run in order to provide recommendations. In this second phase of utilisation of the model it is then crucial that the recommendations determined through the model be explained to the expert.

We adopt the framework of a multi-criterion decision problem, that is to say one consisting in modelling the preferences that an expert may have between various alternatives, these alternatives being described by various attributes or points of view. The term "alternative" is used in the present description in the sense of one of the possibilities offered by a choice. Taking all points of view into account at the same time necessitates making compromises between the criteria that are well satisfied and the criteria that are less well satisfied. This search for compromise necessitates the use of compensatory decisional models. The models are compensatory in the sense that well satisfied criteria compensate for the poorly satisfied criteria. The compensatory models are based on the use of arithmetic operations making it possible to combine elementary decision phenomena.

The present invention pertains more particularly to the phase of utilisation of the model and in particular to the explanation of the suggestions determined through the model. The difficulty is to generate relevant explanations that are complete and that can be understood by the expert.

Certain software (for example Which & Why marketed by the American company Arlington Software Corp.) make it possible to carry out processing on the decisional model once it has been determined. Such software concentrates on a sensitivity analysis of the parameters of the decisional model. The expert has the possibility of noting how the data (that he has provided for the determination of the parameters) are sensitive to the value of the parameters, and conversely to study how a variation in the parameters affects the comparisons between various alternatives. This done, the expert persuades himself of the relevance of the model. Thereafter he will have complete confidence in this model, and he will therefore apply it in full confidence. He will not need an explanation each time the model is run.

However, in decision aid systems, the user is not necessarily the expert with whom the model was established. It is therefore necessary to generate an explanation in the phase of utilization of the model. In this case, the software previously mentioned is not adequate and does not resolve this problem.

In the field of Artificial Intelligence there is a trend relating to argumentation. This relates chiefly to the devising of various arguments (positive or negative) so as to convince a user. Certain works pertain to the explanation of a compensatory aggregation model of the weighted sum type. (cf. J. Montmain, A. Akharraz, G. Mauris "Knowledge management as a support for collective decision-making and argumentation processes" IPMU 2002, pp. 91-98, Annecy, France). Their procedure consists solely in generating, from the whole set of terms present in the aggregation model, the k terms of largest modulus, where k is related directly to the degree of preciseness desired by the expert (for example k=1 if the expert desires only very little information). The argumentation thus generated merely again gives more or fewer terms present in the aggregation function. The complexity of the argumentation (the number k of terms used) depends solely on the expert's desires, whereas it ought to depend on the margin that there is with regard to the decision taken. Specifically, if the decision is taken without question, it is not worth labouring the explanation. Conversely, if the decision is taken narrowly, the argumentation will have to be provided more. Furthermore, no analysis of the factors from which the decision taken actually stems is done in this procedure. This approach is deemed essentially inadequate for providing a relevant and satisfactory explanation to an expert.

The object of the present invention is a method making it possible to explain a decision taken by a compensatory multi-criterion aggregation model, for which the complexity of the argumentation is dependent on the manner in which the decision is taken, the explanations having to be relevant and satisfactory to the user and to the expert.

SUMMARY OF THE INVENTION

The method in accordance with the invention is a method making it possible to explain to a user a decision taken by a compensatory multi-criterion aggregation model, according to which a single compensatory multi-criterion aggregation model is established for the application considered, described by a certain number of phenomena and reproducing a determined expert opinion, and according to a first characteristic of the invention, no reference is made in the explanation to the specificities of the aggregation model if the decision taken had been the same on replacing the aggregation model by any other close model, that, if such is not the case, the aggregation model is simplified by taking into account fewer and fewer phenomena as long as the decision taken remains the same, and that an explanation based solely on the compensation phenomena present in the simplest model previously determined is returned to the user.

According to a second characteristic of the invention, the explanation to be provided in respect of the simplified model is obtained by comparison with an even simpler aggregation model but which leads to a decision that does not comply with the single model.

According to a third characteristic of the invention, the decision consists in choosing one alternative out of two, then the model is evaluated for these two alternatives, the result of the decision being to choose the alternative of higher score, and this decision is explained.

According to a fourth characteristic of the invention, the aggregation model comprises several nested levels of simplification represented by a series of comparison functions $M^1, \ldots, M^p$ for comparing between the two alternatives, the function $M^i$ comprises all the compensation phenomena present in $M^{i-1}$ plus other phenomena, that the function $M^p$ represents the comparison with the initial aggregation model and comprises the set of possible compensation phenomena, the function $M^1$ comprises no compensation phenomenon specific to the aggregation model, if $M^1$ provides the same decision as the aggregation model, the explanation to be provided makes no reference to the specificities of the aggregation model, and in the converse case the explanation is based on the function $M^q$ such that $M^q$ provides the same decision as the aggregation model and the preceding comparison functions $M^1, \ldots, M^{q-1}$ provide the opposite decision.

According to a fifth characteristic of the invention, the explanation of the decision taken by the comparison function $M^q$ is effected by comparison with a comparison function $M^j$ with $j<q$, that is more simplified but provides the wrong decision, the compensation phenomena used in the explanation are those contained in $M^q$ but not contained in $M^j$, and to determine from among these phenomena those which have actually counted in the decision taken, behaviors are progressively appended to $M^j$ until the decision taken is in accordance with the single model.

According to a sixth characteristic of the invention, the aggregation model corresponds to a weighted sum or a 2-additive Choquet integral.

According to a seventh characteristic of the invention, there are four comparison functions, the first comparison function $M^1$ indicates that an alternative is preferred to a second if the first alternative is better than the second according to all criteria, the second comparison function $M^2$ corresponds to the comparison by an arithmetic mean, the third comparison function $M^3$ contains only the phenomena of importance of the criteria, the fourth comparison function $M^4$ contains the whole set of phenomena of importance and of interaction between criteria, if the first comparison function giving the decision in accordance with the single model is $M^3$, then one determines the phenomena to be put into the explanation by comparison with $M^2$, and if the first comparison function giving the decision in accordance with the single model is $M^4$, then one determines the compensation phenomena to be included in the explanation by comparison with $M^2$.

According to an eighth characteristic of the invention, the decision to be taken consists in evaluating an alternative, in evaluating the model for this alternative and in explaining this evaluation.

According to a ninth characteristic of the invention, the whole set of evaluations is split into two 2m+1 ordered levels $N_{-m}, \ldots, N_0, \ldots, N_m$, the level $N_{-m}$ is the worst, the level $N_0$ is average, that is to say neither good nor bad, $N_m$ is the best level, each level is characterized by a minimum value and a maximum value, the level $N_k$ corresponding to its evaluation by the model is determined for the alternative, one explains why the alternative is preferred to an alternative whose values according to all criteria are equal to the minimum value of the level $N_k$ by applying one of characteristics 2 to 7, and one explains why the alternative is less well preferred to an alternative whose values according to all criteria are equal to the maximum value of the level $N_k$ by applying one of characteristics 2 to 7.

According to a tenth characteristic of the invention, when $k>0$, one indicates that "the alternative is $N_k$" by applying one of characteristics 2 to 7 to the comparison between the alternative and an alternative whose values according to all the criteria are equal to the minimum value of the level $N_k$, and that one indicates that "the alternative is not $N_{k+1}$" by applying one of characteristics 2 to 7 to the comparison between the alternative and an alternative whose values according to all the criteria are equal to the maximum value of the level $N_k$.

According to an eleventh characteristic of the invention, when $k<0$, one indicates that "the alternative is $N_k$" by applying one of characteristics 2 to 7 to the comparison between the alternative and an alternative whose values according to all the criteria are equal to the maximum value of the level $N_k$, and one indicates that "the alternative is not $N_{k-1}$" by applying one of characteristics 2 to 7 to the comparison between the alternative and an alternative whose values according to all the criteria are equal to the minimum value of the level $N_k$.

According to a twelfth characteristic of the invention, when $k=0$, one indicates that "the alternative is not $N_1$" by applying one of characteristics 2 to 7 to the comparison between the alternative and an alternative whose value according to all the criteria are equal to the maximum value of the level $N_0$, and one indicates that "the alternative is not $N_{-1}$" by applying one of characteristics 2 to 7 to the comparison between the alternative and an alternative whose values according to all the criteria are equal to the minimum value of the level $N_0$.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention will be better understood on reading the detailed description of a mode of implementation, taken by way of nonlimiting example and illustrated by an appended drawing, in which.

DETAILED DESCRIPTION OF THE DRAWINGS

Figure 1:
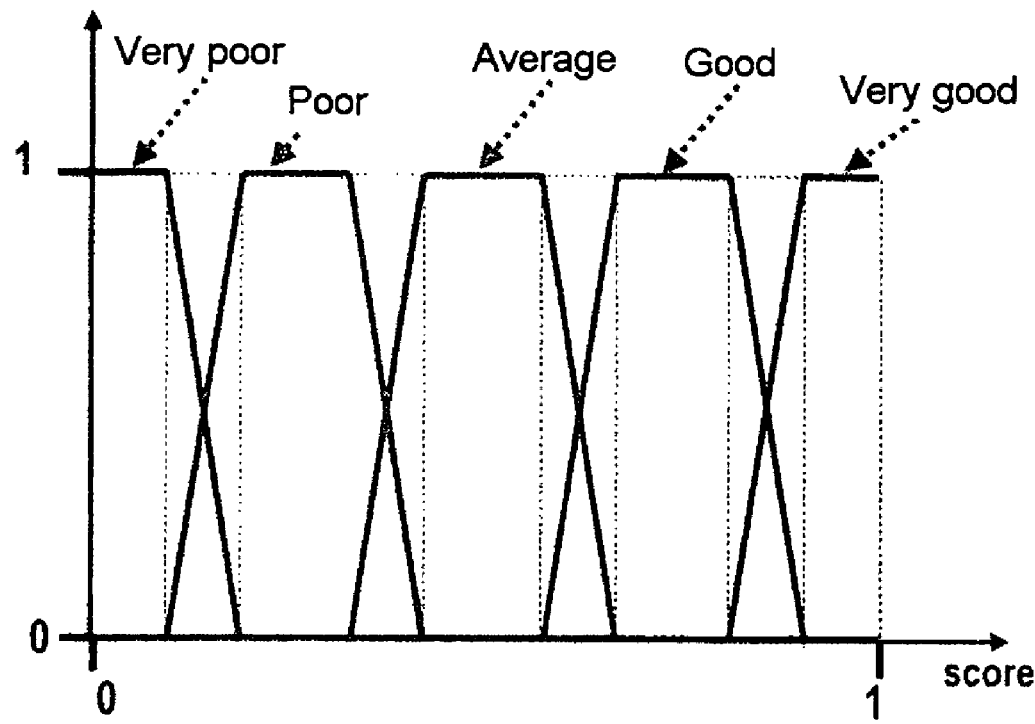
FIG. 1 is a chart of a classical example of modelling by fuzzy sets making it possible to explain the degree of membership in a level of an alternative.

Two problems are dealt with here: the explanation of the comparison between two alternatives, and the explanation of the global score of an alternative. The approach according to the invention consists in simplifying the decisional model as long as the decision taken remains the same. This makes it possible to determine the elementary decision phenomena from which the decision taken actually stems. In a more precise manner, the invention proposes, on the basis of the elementary phenomena from which the decisional model is composed, a series of models comprising more and more elementary phenomena. The first includes none of them and the last includes them all. We then search for the smallest model leading to the same decision as the complete model. Thus, when generating the explanations, we shall base ourselves only on the elementary phenomena in this smallest model. This approach is applied directly to generate the explanation of the comparison between two alternatives. Regarding the explanation of the global score of an alternative, this comes down to two comparisons between alternatives, by splitting the set of possible scores into a partition of levels (for example Very Good, Good, Average, Poor, Very Poor). After determination of the level to which the alternative belongs, the two comparisons consist in explaining why the alternative belongs neither to the immediately higher level, nor to the immediately lower level. For example, for an alternative x which is deemed to be Good, we want to explain why x is neither Average, nor Very Good.

We now quickly describe multi-criterion decision theory. This involves modelling the preference relation denoted $\phi$ that the experts may have regarding the alternatives. The multi-criterion aspect arises from the fact that the alternatives are described by various points of view to be taken into account. More precisely, we propose to use multi-attribute utility theory (R. L. Keeney and H. Raiffa, "*Decision with Multiple Objectives*", Wiley, New York, 1976). This involves modelling the preference relation regarding the results of students by a global utility (global score): $y \geq x \Leftrightarrow U(y) \geq U(x)$.

With each alternative x is therefore associated a global utility U(x) which conveys the degree of preference that the expert accords to x. To describe multi-attribute utility theory, we assume that we have n points of view $X_1, \ldots, X_n$, describing the various aspects to be taken into account to evaluate a student. The global utility function U is taken in the following form:

$$U(x) = F(u_1(x_1), \ldots, u_n(x_n))$$

where F is the aggregation function and the $u_i$ are the utility functions. The n points of view being given in different measurement units, the utility functions serve to go to a unique commensurability scale C. The utility functions therefore serve to be able to compare given values according to various points of view. The scale C is an interval of $\Re$ (typically $C=[0,1]$). The number $u_i(x_i)$ corresponds to the degree of satisfaction that the expert accords to the alternative relating solely to the point of view $X_i$. The aggregation function F therefore aggregates the degrees of satisfaction of an alternative according to the various points of view, and returns the global degree of satisfaction. It is recalled that a function F of $[0,1]^n$ in $[0,1]$ is said to be an aggregation function if it satisfies two elementary properties: growth (if for all i we have $y_i \geq x_i$ then $F(y) \geq F(x)$) and compensation (that is to say $\min_i y_i \leq F(y) \leq \max_i y_i$)

To fully determine the model, we go through the following two phases:

Phase 1: Formalisation of the criteria.

A certain number of pieces of software make it possible to determine the utility functions $u_i$ ("Expert Choice", "Criterion Decision Plus", "MACBETH poids").

Phase 2: Determination of the aggregation function:

Numerous pieces of software and techniques make it possible to determine the aggregation function F when the latter is a weighted sum: "Expert Choice", "Criterion Decision Plus", "MACBETH cotes", "TOPSIS", "DESCRIPTOR".

The restriction to a weighted sum does not make it possible to model slightly finer decision strategies.

To alleviate this, the Choquet integral (G. Choquet, "Theory of capacities", Annales de l'Institut Fourier, No 3, pp. 131-295, 1953) was introduced as aggregation function. It makes it possible to model the importance of the criteria, the interaction between criteria and the typical decision strategies (veto, in favour, tolerance, intolerance) (M. Grabisch, "*The application of fuzzy integrals in multicriteria decision making*", Europ. J. of Operational Research, No 89, pp. 445-456, 1996). Several procedures make it possible to determine the parameters of the Choquet integral from learning data provided by the expert: mention may be made of a heuristic procedure (M. Grabisch, "A new algorithm for identifying fuzzy measures and its application to pattern recognition", in Int. Fuzzy Engineering Symposium, pp 145-150, Yokohama, Japan, 1995), and a linear procedure (J. L. Marichal, M. Roubens, "Dependence between criteria and multiple criteria decision aid", in $2^{nd}$ Int. Workshop on Preferences and Decisions, pp. 69-75, Trento, Italy, 1998).

The above description relates to the case where all the points of view are aggregated at the same level. Nevertheless, when the number of points of view becomes fairly significant, in practice we construct several cascaded aggregation levels. In this case, we generate a cascaded explanation at each level, beginning with the highest level.

Once the decisional model has been determined, the two problems dealt with may be written in the following form: explain why an alternative "y" is better than an alternative "x" according to the model, that is to say $U(x)<U(y)$, and explain the global score $U(x)$ of an alternative x according to the model.

We now describe more precisely a particular case of the Choquet integral known by the name 2-additive Choquet integral. Of course, this multi-criterion aggregation function is not the only one possible within the framework of the invention. We assume that we have n criteria that we wish to summarize to obtain a global evaluation. We assume that these criteria are already rendered commensurable by virtue of the introduction of utility functions. Stated otherwise, the scores according to each criterion are given directly in the interval $[0,1]$ of the numbers lying between 0 and 1. Any other interval is entirely conceivable. We could equally well take any interval of $\Re$. These scores correspond to a degree of satisfaction. For example, the score 0.6 corresponds to a rather good degree of satisfaction. We denote by $x_i$ the score of the action x according to criterion i. The score $x_i$ corresponds to the degree of satisfaction of the alternative x relating to point of view No. i. The great majority of the aggregation models used in practice correspond to a weighted sum:

$$F(x) = a_1 x_1 + \ldots + a_n x_n$$

where each coefficient $a_i$ lies between 0 and 1, and their sum equals 1: $a_1 + \ldots + a_n = 1$. The coefficient $a_i$ represents the importance of criterion i in the global evaluation. The condition $a_1 + \ldots + a_n = 1$ implies that $H(t, \ldots t) = t$ for any number t. If the number t corresponds for example to the level good (typically $t=0.7$), this relation signifies that an alternative which is deemed good according to all the criteria is deemed globally good. This conveys the idea of commensurability.

The weighted sum is the simplest compensatory aggregation function. It makes it possible to model only the relative importance of the criteria. Other very important phenomena are also present in the aggregation of criteria. This is chiefly the interaction between criteria. There are two types of interaction. The first type of interaction is said to be positive and corresponds to an intolerant expert. The latter is satisfied if several criteria are satisfied at the same time. He does not want there to be any weak points. This way of aggregating corresponds to the min function: the global score is the smallest out of the scores. The second type of interaction is said to be negative and corresponds to a tolerant expert. In order for him to be satisfied, it suffices for a single criterion to be well satisfied. It contributes nothing to be good according to several criteria at the same time. This way of aggregating corresponds to the max function: the global score is the largest out of the scores. These two attitudes of tolerance and of intolerance are extremes. Most cases correspond to a combination of attitudes of this type, applied to a subset of criteria. By limiting ourselves to interactions between pairs of criteria, we obtain:

$$F(x)=a_1x_1+\ldots+a_nx_n+b_{1,2}\min(x_1,x_2)+\ldots+b_{n-1,n}\min(x_{n-1},x_n)+c_{1,2}\max(x_1,x_2)+\ldots+c_{n-1,n}\max(x_{n-1},x_n)$$

where each coefficient lies between 0 and 1, and their sum equals 1: $a_1+\ldots+a_n+b_{1,2}+\ldots+b_{n-1,n}+c_{1,2}+\ldots+c_{n1,n}=1$. We can show that the above expression may be written in the following form $F(x)=\Sigma_i v_i \cdot x_i - \Sigma_{(I,j)}|x_i-x_j|\cdot I_{ij}/2$. In this expression, the term $|x_i-x_j|\cdot I_{ij}/2$ corresponds to the interaction between criteria i and j. The sign of $L_{ij}$ gives the type of interaction, positive or negative. This type of aggregation operator is called a 2-additive Choquet integral. We will denote it by $C^2\mu$ in what follows. It is of course possible to use more complex aggregation operators such as for example the general Choquet integral.

According to the general principle of the method of the invention, we wish to explain the decisions and the choices arising from the aggregation function F. The alternatives are assumed to be described directly by their performance ratings according to the n criteria to be taken into account. We denote such an alternative by $x=(x_1,\ldots,x_n)$. We have to provide an expert with a written explanation which is understood by the expert and which convinces him. This explanation must therefore be the simplest possible so as not to overwhelm the expert. It must however be complete and reflect that which the decision taken actually stemmed from. We are interested in the following two problems:

Explain why x<y, that is to say F(x)<F(y).

Explain the score F(x) of an alternative x.

The second problem will be dealt with by reducing it to the first case.

Explain Why x<y, that is to Say F(x)<F(y)

We begin by describing the general principles that we propose in order to explain why x<y, that is to say F(x)<F(y).

The method of the invention is based on the following three principles:

The first principle is that it is not necessarily worthwhile making reference to the specificities of the aggregation function if the decision taken had been the same on replacing the aggregation operator by a large variety of other aggregation operators.

We saw previously that the 2-additive Choquet integral could be written as a combination of particular attitudes typical of decisions (tolerance, intolerance, etc). Any compensatory aggregation function may be decomposed into this form, that is to say into the form of a convex sum of typical decision attitudes. We base ourselves largely on this decomposition. All the same it is not necessary to refer to the whole set of phenomena in the explanation. In order not to overwhelm the expert, the idea is to mention only the determinant arguments that actually contributed to the taking of a decision. The second principle is therefore that the aggregation operator is simplified (by taking account of fewer and fewer phenomena) as long as the decision taken remains the same. This makes it possible to determine the decision phenomena from which the decision taken actually stems.

The third principle is that the explanation is determined by comparison between two aggregation functions providing opposite decisions. We then seek to ascertain what leans the decision in favor of an alternative. This principle will be applied to various operators and to various alternatives.

The whole set of decision phenomena modelled by F are grouped into nested subsets. This leads us to define p levels of growing complexity comprising more and more decision phenomena. At each level, we must specify whether x is preferred or not to y. In order for the account to be as general as possible, the comparisons are made through so-called comparison functions. This provides a series of comparison functions $M^1_k(x,y),\ldots,M^p_k(x,y)$ for comparing x and y. $M^i_k(x,y)$ represents family No. i indexed by k describing the set of possible phenomena at level i. The sign of $M^i_k(x,y)$ indicates whether the decision taken, taking account only of family No. i of phenomena, is the same or not as with F. If $M^i_k(x,y)<0$, then the decision taken is the same as F. As i grows, $M^i_k(x,y)$ comprises more and more phenomena. We have $M^p_k(x,y)=F(x)-F(y)$.

When for all i, we have $x_i<y_i$, then any aggregation function whatsoever will indicate that y is preferred to x. It is therefore not worthwhile in this case invoking the specificities of the aggregation operator F to explain the decision taken. Here we apply the first principle. This leads us to take for the first approximation $M^1_k(x,y)=\min_{i\in(1,\ldots,n)}(x_i-y_i)$. We have in fact $M^1_k(x,y)<0$ if for all i, we have $x_i<y_i$.

The second principle indicates that, in the explanation, we replace F with the simplest approximation providing the same decision, that is to say the smallest i such that $M^1_k(x,y)\geq 0,\ldots,M^1_k(x,y))\geq 0$ and $M^i_k(x,y)<0$. The third principle then consists in explaining why $M^i_k(x,y)<0$ whereas $M^j_k(x,y)>0$, for j<i, provide opposite decisions. We do not always take j=i−1.

To summarize, according to the invention, we calculate the index i for which $M^1_k(x,y)\geq 0,\ldots,M^{i-1}_k(x,y)\geq 0$ and $M^i_k(x,y)<0$. If i=1, then it suffices to indicate that the decision is trivial since all the scores of y are better than those of x. If i>1, then we explain why $M^i_k(x,y)<0$ whereas $M^i_k(x,y)\geq 0$ for j<i. We then base ourselves on the elementary phenomena present at level i and absent at level j. We may also possibly explain why $M^j_k(x,y)\geq 0$ by applying the method of explanation recursively to $M^j_k$.

According to this method, the complexity of the explanation generated depends naturally on the margin that there is regarding the decision taken (was the decision taken lightly or not?).

Explain the Score F(x) of an Alternative x

We now want to explain the global score of x, that is to say to explain why F(x) equals a certain value α. There is no benefit in explaining the exact value of α. On the other hand, an expert wishes to know why α is deemed to be rather poor, rather good or average. We therefore want to explain why α belongs to a certain fuzzy level. We assume that we have 2 m+1 fuzzy levels: $N_{-m},\ldots,N_0,\ldots,N_m$. Level $N_{-m}$ is the worst (VERY BAD), $N_0$ is average (neither good nor bad) and Nm is the best level (VERY GOOD). In fuzzy set theory, it is classical to model such levels x by fuzzy sets (cf. FIG.

Figure 2:
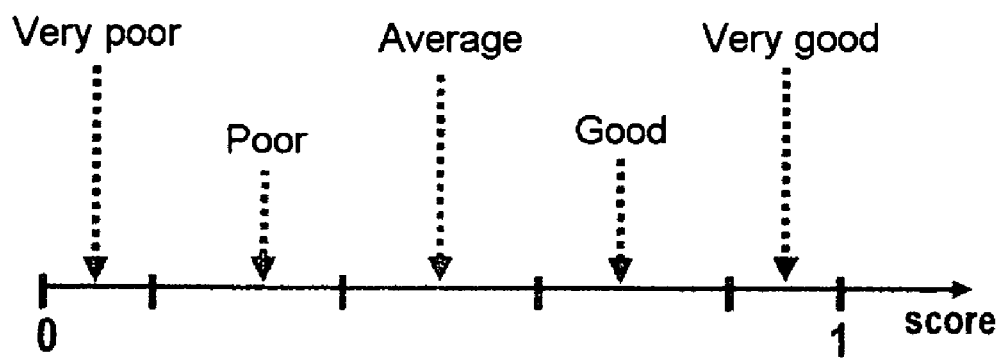
FIG. 2 is a representation by a nonfuzzy set of the example of FIG. 1.

1, in which are represented five fuzzy sets, ranging from "very bad" to "very good". In order to avoid the use of "linguistic modifiers" (which are inevitable for characterizing the intermediate values between two fuzzy sets) which would add additional complexity to the explanation, we represent each linguistic level by a nonfuzzy set $N_i=]m_i, M_i]$. The linguistic levels form a "tiling" if we assume that for all i, $M_i=m_{i+1}$. This corresponds to FIG. 2, in which are represented the five nonfuzzy sets corresponding to those of FIG. 1. Any score then belongs to a unique level with a degree 1.

Knowing α, we firstly determine the corresponding fuzzy level, that is to say the integer $i_\epsilon\{-p, \ldots, p\}$ such that $\alpha_\epsilon]m_i, M_i]$. Explaining why α is $N_i$ (that is to say that a belongs to $N_i$) amounts to showing why α is neither $N_{i+1}$ (that is to say $\alpha<m_{i+1}$) nor $N_{i-1}$ (that is to say $\alpha>M_i$). We therefore wish to explain why $\alpha<M_i$ and $\alpha>m_i$. Stated otherwise, using the property that $F(t, \ldots, t)=t$ for all t, we reduce to what is set forth hereinbelow in regard to the determination of the first or of the second solution for the explanation of a comparison between two alternatives, by explaining why $x<(M_i, \ldots, M_i)$ and why $x>(m_i, \ldots, m_i)$, where $(t, \ldots, t)$ is the alternative which equals t according to all the criteria.

The principle of the explanation is then as follows: we begin by giving the general trend ("rather good" or "rather bad"), then we refine.

If i>0, we begin by explaining why α is rather good. By using the argumentation of the explanation of $x>(m_i, \ldots, m_i)$, the explanation to be provided is:

"x is $N_i$ since . . . "

Thereafter, we must explain why α is not excellent, if α is not already so. Hence if i<p, using the argumentation of the explanation of $x<(M_i, \ldots, M_i)$, the second piece of the explanation is therefore:

"x is not $N_{i+1}$ since . . . "

If i<0, we begin by explaining why α is rather bad. Using the argumentation of the explanation of $x<(M_i, \ldots, M_i)$, the explanation to be provided is:

"x is $N_i$ since . . . . "

Thereafter, we must thereafter explain why α is not entirely zero, if α is not already so. Hence if i>-p, using the argumentation of the explanation of $x>(m_i, \ldots, m_i)$, the second piece of the explanation is therefore:

"x is not $N_{i-1}$ since . . . "

When i=0, we explain why α is neither good nor bad. Using the argumentation of the explanation of $x<(M_i, \ldots, M_i)$, the explanation to be provided is:

"x is not $N_1$ since . . . "

Using the argumentation of the explanation of $x>(m_i, \ldots, m_i)$, the second piece of the explanation is therefore:

"x is not $N_{-1}$ since . . . "

Hereinbelow we shall describe two concrete solutions in the case where F is the 2-additive Choquet integral.

According to the method just described, it suffices to make the explanation explicit for a comparison between two alternatives, the explanation of global score being deduced therefrom.

Determination of a First Solution for the Explanation of a Comparison Between Two Alternatives.

We shall detail here a first solution for the explanation of a comparison between two alternatives, in the case where F is the 2-additive Choquet integral. In accordance with the general approach described, we must define a nested series of approximations of $C^2\mu$:

The first approximation is $M^1{}_k(x,y)=\min_{i\in(1,\ldots,n)}(x_i-y_i)$. We have $M^1{}_k(x,y)<0$ if for all i, we have $x_i<y_i$.

The second approximation is $M^2{}_k(x,y)=S(x)-S(y)$, where S is the arithmetic mean, that is to say $S(x)=(x_1+\ldots+x_n)/n$.

The third approximation is $M^3{}_k(x,y)=C^1\mu(x)-C^1\mu(y)$, where $C^1\mu$ is a weighted sum. The function $C^1\mu$ involves only the phenomena of importance of the criteria. We have $C^1\mu(x)=\Sigma_i v_i x_i$. The indices k therefore demarcate the phenomena of importance of the criteria.

The last approximation is $M^4{}_x(x,y)=C^2\mu(x)-C^2\mu(y)$ This is therefore the complete decisional model. The phenomena of importance of the criteria, and of interaction between pairs of criteria are modelled. The indices k therefore demarcate the phenomena of importance and of interaction.

In accordance with the general method described previously, we determine the smallest approximation leading to the same decision as $C^2\mu$. We will now set forth the explanation to be provided in each case.

Case where $x_i<y_i$ for All i, that is to Say where $M^1{}_k(x,y)<0$:

We have $M^1{}_k(x,y)<0$ if for all i, we have $x_i<y_i$. In this case, any aggregation function whatsoever will indicate that y is preferred to x. It is therefore not worthwhile in this case invoking the specificities of the aggregation operator $C^2\mu$ to explain the decision taken. Here we apply the first principle. The explanation to be provided is therefore simply the following:

"y is preferred to x since ALL the scores of y are better than those of x."

Case where $S(x)<S(y)$ but $\exists i$ such that $x_i \geq y_i$, that is to say where $M^2{}_k(x,y)<0$ and $M^1{}_k(x,y)\geq 0$:

When certain criteria of x are better satisfied than those of y, and vice versa, we must refer a minimum to an aggregation function to explain the score. The first aggregation operator which comes to mind is the arithmetic mean. This is the aggregation operator that would be used in the absence of information: all the criteria have the same importance, and there is no particular interaction between the criteria. When $S(x)<S(y)$, it may be sufficient to say that x is on average less good than y to explain x<y. Here we apply the first two principles. The explanation to be provided is then as follows:

"y is preferred to x since the scores of y are on average better than those of x."

Case where $C^1\mu(x)<C^1\mu(y)$ but $S(x)\geq S(y)$, that is to say where $M^3{}_k(x,y)<0$, $M^2{}_k(x,y)>0$ and $M^1{}_k(x,y)>0$:

When $C^1\mu(x)<C^1\mu(y)$, we use in accordance with the second principle the aggregation function $C^1\mu$ in the explanation. We assume here that $S(x)\geq s(y)$.

When $C^1\mu(x)<C^1\mu(y)$ but $S(x)\geq S(y)$, we feel intuitively that the criteria for which y is better than x are more important on average than the criteria for which x is better than y. Here this involves applying the third principle.

To find among the coefficients $v_i$ those that actually counted in the decision, we use the second principle once again. More precisely, we progressively replace the weights $v_i$ by 1/n as long as the decision taken remains the same. Let $N=\{1, \ldots, n\}$ be the set of criteria. For $A\subseteq N$, we define $C^1\mu A(x)=\Sigma_{i\in A} v_i x_i + \Sigma_{i\notin A} x_i/n$. Let therefore $\Omega=\{A\subseteq N, C^1\mu, A(x)<C^1\mu, A(y)\}$. The set $\Omega$ therefore groups together all the subsets of phenomena of importance of criteria leading to the same decision as $C^2\mu$. We have $\emptyset \not\in \Omega$ and $N \in \Omega$.

We state the following lemma:

Lemma 1: Let $A \in \Omega$. We denote by p the number of elements of A. Then there exists at least one n-p tuple of pairwise distinct criteria denoted $c_1, \ldots, c_{n-p}$ such that $A \cup \{c_1\} \in \Omega$, $A \cup \{c_1, c_2\} \in \Omega$, $\ldots$, $A \cup \{c_1, \ldots, c_{n-p}\} \in \Omega$ and $A \cup \{c_1, \ldots, c_{n-p}\} = N$.

This lemma is very important since it gives a justification for the "replacement" of $C^1\mu$ by $C^1\mu, A$ in the explanation. Specifically, it indicates that we have:

$$C^1\mu, A(x) < C^1\mu, A(y), C^1\mu, A \cup \{c_1\}(x) < C^1\mu, A \cup \{c_1\}(y),$$
$$C^1\mu, A \cup \{c_1, c_2\}(x) < C^1\mu, A \cup \{c_1, c_2\}(y), \ldots C^1\mu,$$
$$A \cup \{c_1, \ldots c_{n-p}\}(x) = C^1\mu(x) < C^1\mu(y) = C^1\mu,$$
$$A \cup \{c_1, \ldots c_{n-p}\}(y)$$

Consequently, the above lemma proves that we can go progressively from the operator $C^1\mu$ to the operator $C^1\mu, A$ (the whole time keeping the same decision taken), modifying only one weight at a time. We can then replace $C^1\mu$ by $C^1\mu, A$ in the explanation to be provided.

In order to simplify the explanation, we therefore seek the coalitions $A \in \Omega$ of smallest cardinality. We therefore seek the minimal $A \in \Omega$ in the sense of inclusion. These are the coalitions $A \in \Omega$ such that $\forall i \in A$, $A \setminus \{i\} \in \Omega$. As the following lemma shows, such coalitions satisfy interesting properties:

Lemma 2: Let $A \in \Omega$ be minimal. Then necessarily, $x_i < y_i$ for all $i \in A$ such that $v_i > 1/n$, and $x_i > y_i$ for all $i \in A$ such that $v_i 1/n$.

Stated otherwise, if $A \in \Omega$ is minimal, then the criteria of A for which y is better than x are important (i.e. $v_i > 1/n$), whereas the criteria of A for which x is better than y are unimportant (i.e. $v_i < 1/n$). We therefore get back to exactly the intuition given hereinabove. The above lemma is essential since it makes it possible to generate a complete and very simple explanation.

Let $I^+ = \{i \in N, x_i > y_i\}$ and $I^- = \{i \in N, x_i < y_i\}$.

If $A \cap I^- \neq \emptyset$, then the explanation to be provided is: "Although x is on average better than y, y is nevertheless preferred to x since y is better than x as regards the criteria $A \cap I^-$ which are important, whereas y is less good than x as regards the criteria $A \cap I^+$ which are unimportant".

If $A \cap I^- = \emptyset$, then the explanation to be provided is: "y is preferred to x since the criteria $A \cap I^+$ with regard to which x is better than y are unimportant, and do not compensate for the fact that y is on average better than x with regard to the other criteria."

Case where $C^2\mu(x) < C^2\mu(y)$ but $C^1\mu(x) \geq C^1\mu(y)$ and $S(x) \geq S(y)$, that is to say where $M^4_k(x,y) \geq 0$, $M^3_k(x,y) \geq 0$, $M^2_k(x,y) \geq 0$ and $M^1_k(x,y) \geq 0$:

It is assumed here that $C^2\mu(x) < C^2\mu(y)$ but that $C^1\mu(x) \geq C^1\mu(y)$ and $S(x) \geq S(y)$. We have $C^2\mu(x) = \Sigma_i v_i \cdot x_i - \Sigma_{(i,j)} |x_i - x_j| \cdot I_{ij}/2$. The fact that $C^1\mu(x) \geq C^1\mu(y)$ does not lead us to base the explanation solely on the interaction phenomena. Specifically, the phenomena of importance also counted in the decision taken, but they were not sufficient. We therefore wish to explain, according to the third principle, why $C^2\mu(x) < C^2\mu(y)$ although $S(x) \geq S(y)$.

As previously, in order to simplify the explanation as far as possible, we wish to remove certain interactions and replace certain $v_i$ by $1/n$. We will therefore denote by A the criteria for which we retain the terms of importance vi. The set $N^* = \{\{i,j\} \in N \times N, i \neq j\}$ provides the set of pairs of indices that may appear in the interaction terms. We denote by $A^*$ the interaction terms that are kept. For $A \subseteq N$, we define $v^*_i = v_i$ if $i \in A$ and $v^*_i = 1/n$ if $i \in A$. For $A^* \subseteq N^*$, we define $I^*_{ij} = I_{ij}$ if $\{i,j\} \in A^*$ and $I^*_{ij} = 0$ if $\{I,j\} \in A^*$. The coefficients $v^*_i$ and $I^*_{ij}$ correspond to the new coefficients of importance and of interaction.

The coefficients of importance $v^*_i$ and the coefficients of interaction $I^*_{ij}$ must satisfy certain conditions. These are the so-called "monotonicity" conditions. These conditions are equivalent to the fact that the corresponding aggregation function is increasing. These conditions may be written in the form: $\forall i \in N$, $v^*_i + \Sigma_{j \neq i} \pm I^*_{ij}/2 \geq 0$ for all the possible combinations of + and of −. The following lemma gives conditions for which monotonicity holds.

Lemma 3: If $A \subseteq N$ and $A^* \subseteq N^*$ satisfy the condition $\{i,j\} \in A^* \Rightarrow i \in A$ and $j \in A$ then the 2-additive measure formed of $v^*_I$ and of the $I^*_{ij}$ is monotonic.

We will assume hereinbelow that this condition is satisfied.

We thus define:

$$C^2\mu, A, A^*(x) = \Sigma_i v^*_i x_i - \Sigma_{(i,j)} |x_i - x_j| \cdot I^*_{ij}/2 = \Sigma_{i \in A} v_i x_i + \Sigma_{i \notin A} x_i/n - \Sigma_{(i,j) \in A^*} |x_i - x_j| \cdot I_{ij}/2$$

Let therefore:

$$\Omega^* = \{A \times A^* \subseteq N \times N^*, C^2\mu, A, A(x) < C^2\mu, A, A(y) \text{ et } \{i,j\} \in A^* \not\subset i, j \in A\}.$$

These are the sets of importance and of interaction leading to the same decision as $C^2\mu$. We have $(\emptyset, \emptyset) \in \Omega^*$ and $(N, N^*) \in \Omega^*$. As previously, we are interested in the minimal elements of $\Omega^*$. The following lemma gives interesting properties satisfied by such elements.

Lemma 4: Let $(A, A^*) \in \Omega^*$ be minimal. Then $I_{ij} > 0$ for all $(i,j) \in A^*$ such that $|x_i - x_j| > |y_i - y_j|$ $I_{ij} < 0$ for all $\{i,j\} \in A^*$ such that $|x_i - x_j| < |y_i - y_j|$ $\forall i \in A \cap I^-$, we have $v_i - 1/n < \Sigma_{j, (i,j) \in A}^* (|x_i - x_j| - |y_i - y_j|)/(x_i - y_i) \cdot I_{ij}/2$ $\forall i \in A \cap I^-$, we have $v_i - 1/n < \Sigma_{j, (i,j) \in A}^* (|x_i - x_j| - |y_i - y_j|)/(x_i - y_i) \cdot I_{ij}/2$ As the interaction phenomena are determinant in explaining the decision taken, we are interested in the $(A, A^*) \in \Omega^*$ that are minimal in $\Omega^*$ such that $A^* \neq \emptyset$. Let $D^{*1+} = \{\{i,j\} \in N^*, I_{ij} > 0\}$ and $D^{*1-} = \{\{i,j\} \in N^*, I_{ij} < 0\}$. Let $D^- = \{i \in N, v_i > 1/n\}$ and $D^+ = \{i \in N, v_i < 1/n\}$. All the interaction terms of $A^*$ are used in the explanation. On the other hand, we do not necessarily use all the terms of importance of A in the explanation. According to lemma 3, certain terms of importance are present in A only in order to satisfy the monotonicity condition. They did not actually count in the decision taken. Consequently, in the explanation we shall mention only the terms of importance satisfying the conditions of lemma 2. Stated otherwise, in the explanation we mention only the terms of importance belonging either to $A \cap I^- \cap D^+$ or to $A \cap I^- \cap D^+$. The explanation to be provided is as follows:

"y is preferred to x since the interaction is positive with regard to the pairs $A^* \cap D^{*1+}$ for which the deviation in the scores of x is greater than those in the scores of y, the interaction is negative with regard to the pairs $A^* \cap D^{*1-}$ for which the deviation in the scores of x is less than those in the scores of y, x is less good than y with regard to the criteria $A \cap I^- \cap D^+$ which are important, and x is better than y with regard to the criteria $A \cap I^- \cap D^+$ which are unimportant."

To make the explanation more convincing in the matter of the interaction terms, we propose to return to the results of lemma 4. Let $\{i,j\} \in A^*$ be such that $I_{ij} > 0$. Then according to lemma 4, we have $|x_i - x_j| > |y_i - y_j|$. We assume for example that $x_i > x_j$. Then the explanation to be provided regarding a positive interaction term is: " . . . the score of x with regard to criterion i is penalised by a worse score according to criterion j (the criteria i and j must both be satisfied) . . . "

We now consider the case of negative interactions. Let $\{i,j\} \in A^*$ such that $I_{ij}<0$. Then according to lemma 4, we have $|x_i-x_j|<|y_i-y_j|$. We assume for example that $y_i<y_j$. Then, the explanation to be provided with regard to a negative interaction term is: " . . . the score of y with regard to criterion i has been redeemed by a better score with regard to criterion j (it suffices to satisfy one of the two criteria i or j) . . . "

The explanation thus generated does not presuppose any user knowledge with regard to the interaction phenomena and is easily comprehensible.

We assume that $A^* \cap D^{*I+}=\{(i_1,j_1), \ldots, (i_p,j_p)\}$ and $A^* \cap D^{*I-}=\{(k_1,l_1), \ldots, (k_q,l_q)\}$ with $x_{i1}>x_{j1}, \ldots, x_{ip}>x_{jp}$ and $y_{k1}<y_{i1}, \ldots, y_{kq}<y_{lq}$. The explanation to be provided is therefore as follows:

"y is preferred to x since the score of x with regard to criterion $i_1$ is penalised by a worse score according to criterion $j_1$ (the criteria $i_1$ and $j_1$ must both be satisfied), . . . , the score of x with regard to criterion $i_p$ is penalised by a worse score according to criterion $j_p$ (the criteria $i_p$ and $j_p$ must both be satisfied), the score of y with regard to criteria $k_1$ has been redeemed by a better score with regard to criterion $l_1$ (it suffices to satisfy one of the two criteria $k_1$ or $l_1$), the score of y with regard to criterion $k_q$ has been redeemed by a better score with regard to criterion $l_q$ (it suffices to satisfy one of the two criteria $k_q$ or $l_q$), x is less good than y with regard to the criteria $A \cap I^- \cap D^+$ which are important, and x is better than y with regard to the criteria $A \cap I^- \cap D^+$ which are unimportant."

Determination of a Second Solution for the Explanation of a Comparison Between Two Alternatives:

We shall now detail a second solution for the explanation of a comparison between two alternatives, in the case where F is the 2-additive Choquet integral. The procedure described in the previous section is worth refining. For example, it is not always sufficient to say that y is preferred to x since the scores of y are on average better than those of x though the arithmetic mean provides the same decision as $C^2\mu$. On the other hand, it may be opportune not to replace $C^2\mu$ by a simpler aggregation function unless the decision taken with these two aggregation functions is indeed the same but, moreover, is roughly speaking as clear-cut.

It is no longer as easy to explain the comparison functions $M^1_k(x,y)$ as previously. Most of the time, we will not specify these functions. We will give only the conditions under which we have $M^i_k(x,y)<0$ and $M^1_k(x,y) \geq 0$.

General Algorithm

The various constants X given below are numbers lying between 0 and 1 (typically 0.3).

Case 1: When $\forall i \in N, x_i<y_i$, we use what is in the above section dealing with the case where $x_i<y_i$ for all i.

Case 2: When the three aggregation functions S, $C^1\mu$ and $C^2\mu$ provide the same decision and if these decisions taken are very clear-cut, then a large number of aggregation functions will provide the same decision.

By continuity arguments, if $C^1\mu(x)<C^1\mu(y)$ then there exists a multitude of weights close to v (v being the indices of importance) providing the same decision as $C^1\mu$, that is to say $\Sigma_i \lambda_i x_i < \Sigma_i \lambda_i y_i$. To be more precise, we adopt the standpoint of the set $\Re^n$ of possible weights. We can then show that there exists in $\Re^n$ a ball with centre v and radius $$\frac{C^1_\mu(y) - C^1_\mu(x)}{\sqrt{\frac{1}{n}\sum_i (x_i - y_i)^2}}$$

composed only of weights $\lambda$ for which the decision taken is the same as with $C^1\mu$. The bigger the radius of this ball, the less necessary it is to mention the specificities of the aggregation functions in the explanation. This also holds for S and $C^2\mu$. Stated otherwise, when $$\frac{S(y) - S(x)}{\sqrt{\frac{1}{2}\sum_i (x_i - y_i)^2}} \geq \tau_0 \text{ and } \frac{C^1_\mu(y) - C^1_\mu(x)}{\sqrt{\frac{1}{n}\sum_i (x_i - y_i)^2}} \geq \tau_0 \text{ and } \frac{C^2_\mu(y) - C^2_\mu(x)}{\sqrt{\frac{1}{n}\sum_i (x_i - y_i)^2}} \geq \tau_0$$

then we do not use any particular phenomenon of the aggregation operator to explain the decision taken. The above condition is the condition making it possible to have $M^2_k(x,y)<0$. The explanation to be provided is therefore as follows:

"y is preferred to x since the scores of y are on average better than those of x."

Case 3: When $C^1\mu$ provides the right decision and if the decision taken with $C^1\mu$ is almost as clear-cut as with $C^2\mu$, then in the explanation we use only the terms of importance. Stated otherwise, we "replace" $C^2\mu$ by $C^1\mu$ only when the decisions taken by these two operators are relatively similar. The condition requiring $C^1\mu$ to be almost as clear-cut as with $C^2\mu$ decomposes into two parts. Firstly, it must be pointed out that the decision taken with $C^1\mu$ should not be much more clear-cut than with $C^2\mu$. This may be conveyed by the inequality: $C^1\mu(x)-C^1\mu(y)>\tau_2(C^2\mu(x)-C^2\mu(y))$. Thereafter, the decision taken with $C^2\mu$ should not be much more clear-cut than with $C^1\mu$. This may be conveyed by the inequality: $C^2\mu(x)-C^2\mu(y)>\tau_4(C^1\mu(x)-C^1\mu(y))$. The final condition for replacing $C^2\mu$ by $C^1\mu$ is therefore:

$C^1\mu(x)<C^1\mu(y)$ and $C^1\mu(x)-C^1\mu(y)>\tau_2 (C^2\mu(x)-C^2\mu(y))$ and $C^2\mu(x)-C^2\mu(y)>\tau_4(C^1\mu(x)-C^1\mu(y))$.

This is the condition for having $M^3_k(x,y)<0$.

This case 3 comprises four subcases:

Case 3a: Here, we assume that the arithmetic mean gives the same decision as $C^1\mu$ but that the decision is more clear-cut with $C^1\mu$ than with the arithmetic mean. This implies that $C^1\mu(x)-C^1\mu(y)<<S(x)-S(y)<0$. We therefore obtain the following conditions:

$S(x) \leq S(y)$ and $C^1\mu(x)<C^1\mu(y)$ and $C^1\mu(x)-C^1\mu(y)<(1+\tau_1)(S(x)-S(y))$.

This is the condition for having $M^{3a}_k(x,y)<0$. We then use the conclusions set forth hereinbelow in the detailed description of subcase 3a.

Case 3b: Here, we assume that the decision is less clear-cut with the Shapley operator than with the arithmetic mean. Stated otherwise, $S(x)-S(y)<<C^1\mu(x)-C^1\mu(y)<0$. We therefore obtain the following conditions:

$$S(x) \leq S(y) \text{ and } C^1\mu(x) < C^1\mu(y) \text{ and } S(x)-S(y)<(1+\tau_1)(C^1\mu(x)-C^1\mu(y)).$$

This is the condition for having $M^{3b}_k(x,y)<0$. We then use the conclusions which are set forth hereinbelow in the detailed description of subcase 3b.

Case 3c: Here, we assume that the decision is as clear-cut with the Shapley operator as with the arithmetic mean. Stated otherwise, $C^1\mu(x)-C^1\mu(y)\approx S(x)-S(y)<0$. We obtain the following conditions:

$$S(x) \leq S(y) \text{ and } C^1\mu(x) < C^1\mu(y) \text{ and } C^1\mu(x)-C^1\mu(y) \geq (1+\tau_1)(S(x)-S(y))$$

$$\text{and } S(x)-S(y) \geq (1+\tau_1)(C^1\mu(x)-C^1\mu(y)).$$

This is the condition for having $M^{3c}_k(x,y)<0$. We then use the conclusions which are set forth hereinbelow in the detailed description of subcase 3c.

Case 3d: When $S(x)>S(y)$ and $C^1\mu(x)<C^1\mu(y)$, then the decision is not the same with the Shapley operator as with the arithmetic mean. This is the condition for having $M^{3d}_k(x,y)<0$. We then use what was set forth hereinabove in the description of the case where $C^1\mu(x)<C^1\mu(y)$ but $S(x)\geq S(y)$.

When, in cases 3a, 3b and 3c, we reach a situation in which the explanation is not entirely intuitive, then we must use another explanation. We can then have recourse to interaction terms, and hence we refer to the subsequent case 5. It is also conceivable to use a "joker" procedure exploiting only the terms of importance. This procedure can consist in basing the explanation on the terms of largest modulus, the number of terms considered being determined dynamically as a function of the margin with regard to the decision taken. We can then generate a text similar to what was generated in the other cases.

Case 4: If we are not in any of the previous cases, then we must make reference to the interactions as well as to the importances. When we find ourselves here, it is chiefly because the previous case has failed. Here is the contrapositive of the applicability condition of the previous case:

$$C^1\mu(x) \geq C^1\mu(y), \text{ or } C^1\mu(x)-C^1\mu(y) \leq \tau_2(C^2\mu(x)-C^2\mu(y))$$

$$\text{or } C^2\mu(x)-C^1\mu(y) \leq \tau_4(C^1\mu(x)-C^1\mu(y)).$$

This is the condition for having $M^4_k(x,y)<0$. It will be noted that we may also have to replace $\tau_2$ and $\tau_4$ by $\tau_0$, in accordance with what was stated above.

Case 4a: In the first case, we assume that S and $C^2\mu$ lead to different decisions taken and that $C^1\mu(x)-C^1\mu(y)$ lies between $S(x)-S(y)$ and $C^2\mu(x)-C^2\mu(y)$. The condition $S(x)>S(y)$ signifies that S and $C^2p$ lead to different decisions taken. The condition:

$$[(C^1\mu(x)-C^1\mu(y))-(S(x)-S(y))] \times [(C^1\mu(x)-C^1\mu(y))-(C^2\mu(x)-C^2\mu(y))] \leq 0.$$

signifies that $C^1\mu(x)-C^1\mu(y)$ lies between $S(x)-S(y)$ and $C^2\mu(x)-C^2\mu(y)$. Stated otherwise, the term $C^1\mu(x)-C^1\mu(y)$ serves no purpose and may be omitted in the explanation. It suffices to base ourselves on the comparison between S and $C^2\mu$. We therefore adopt the following conditions:

$$S(x)>S(y) \text{ and}$$

$$[(C^1\mu(x)-C^1\mu(y))-(S(x)-S(y))] \times [(C^1\mu(x)-C^1\mu(y))-(C^2\mu(x)-C^2\mu(y))] \leq 0.$$

This is the condition for having $M^{4a}_k(x,y)<0$. We then have two cases:

If $S(x)-S(y)<C^2\mu(x)-C^2\mu(y)$, then the decision taken with the arithmetic mean is the right one and is more clear-cut than with the 2-additive model. The explanation of the relation $S(x)-S(y)<C^2\mu(x)-C^2\mu(y)$ attenuates the explanation of $S(x)-S(y)<0$. The explanation to be provided is therefore:

"y is preferred to x since y is on average better than x. This was partially attenuated by the fact that . . . "
where " . . . " contains the explanation of the relation $S(x)-S(y)<C^2\mu(x)-C^2\mu(y)$.

If $C^2\mu(x)-C^2\mu(y)<0<S(x)-S(y)$, then the arithmetic mean and the 2-additive model give opposite decisions. The explanation to be provided is therefore:

"Although y is on average less good than x, y is nevertheless preferred to x since . . . "where " . . . " contains the explanation of the relation $S(x)-S(y)<C^2\mu(x)-C^2\mu(y)$ The details of the procedure used in this case are found in the conclusions which are set forth hereinbelow in the detailed description of subcase 4a.

Case 4b: We consider all the cases not dealt with previously.

If $C^1\mu(x)-C^1\mu(y)<C^2\mu(x)-C^2\mu(y)<0$, then the decision taken with the Shapley operator is more clear-cut than with the 2-additive model. We then begin by explaining why $C^1\mu(x)-C^1\mu(y)<0$. We then use what was done in case 3. Thereafter, we must explain why the 2-additive model gives a less clear-cut decision. The explanation to be provided is therefore:

"y is preferred to x since . . . This has been partially attenuated by the fact that . . . "
where the first " . . . " contain the explanation of the relation $C^1\mu(x)-C^1\mu(y)<0$, and the second . . . contain the explanation of the relation $C^1\mu(x)-C^1\mu(y)<C_2\mu(x)-C^2\mu(y)$. The explanation of the relation $C^1\mu(x)-C^1\mu(y)<C^2\mu(x)-C^2\mu(y)$ is described more precisely in the conclusions which are set forth hereinbelow in the detailed description of subcase 4b.

If $C^2\mu(x)-C^2\mu(y)<C^1\mu(x)-C^1\mu(y)<0$, then the decision taken with the Shapley operator is less clear-cut than with the 2-additive model. We begin by explaining why the 2-additive model gives a more clear-cut decision than the Shapley operator. As $C^1\mu(x)-C^1\mu(y)<0$, the Shapley operator will globally go in the same direction as the 2-additive model, that is to say that y is preferred to x. Thus, the explanation of $C^1\mu(x)-C^1\mu(y)<0$, although slightly moderating the decision taken by the 2-additive model, is presented as a point which goes in the same direction as the 2-additive model. The explanation to be provided is therefore:

"y is preferred to x since . . . This has been accentuated by the fact that . . . "
where the first " . . . " contain the explanation of the relation $C^2\mu(x)-C^2u(y)<C^1u(x)-C^1\mu(y)$, and the second . . . . . . . contain the explanation of the relation $C^1\mu(x)-C^1\mu(y)<0$. The explanation of the relation $C^2\mu(x)-C^2\mu(y)<C^1\mu(x)-C^1\mu(y)$ is described more precisely in the conclusions which are set forth hereinbelow in the detailed description of subcase 4b.

If $C^2\mu(x)-C^2\mu(y)<0<C^1\mu(x)-C^1\mu(y)$ then the decision taken with the Shapley operator is contrary to that taken by the 2-additive model. We begin by explaining why the 2-additive model gives an opposite decision to that of the Shapley operator.

As $C^1\mu(x)-C^1\mu(y)>0$, the explanation of the decision taken by the Shapley operator goes in the opposite direction to that of the 2-additive model. Thus, the explanation of $C^1\mu(x)-C^1\mu(y)>0$ is given as slightly attenuating the decision taken by the 2-additive model. The explanation to be provided is therefore:

"y is preferred to x since . . . This has been partially attenuated by the fact that . . . "

where the first " . . . " contain the explanation of the relation $C^2p(x)-C^2p(y)<C1u(x)-C^1\mu(y)$, and the second " . . . " contain the explanation of the relation $C^1\mu(x)-C^1\mu(y)>0$. The explanation of the relation $C^2\mu(x)-C^2\mu(y)<C^1\mu(x)-C^1\mu(y)$ is described more precisely in the conclusions which are set forth hereinbelow in the detailed description of subcase 4b.

We shall now describe in greater detail the various subcases of cases 3 and 4.

Subcase 3a: $C^1\mu(x)-C^1\mu(y)<<S(x)-S(y)\leq 0$

When $S(x)<S(y)$ and $C^1\mu(x)<C^1\mu(y)$ and $C^1\mu(x)-C^1\mu(y)<(1+\tau_1)(S(x)-S(y))$, then the decision is more clear-cut with the Shapley operator than with the arithmetic mean. We want to explain why the decision is more clear-cut with the Shapley operator than with the arithmetic mean. Let $\eta=[C^1\mu(x)-C^1\mu(y))+(S(x)-S(y))]/2$. We have $\eta<0$. We want to explain by using the principles developed in the case where $C^1\mu(x)-C^1\mu(y)$ but $S(x)>S(y)$, why $C^1\mu(x)-C^1\mu(y)<\eta$ and $S(x)-S(y)>n$. In the same vein as what was done in these conclusions, i.e.:

$$\Omega=\{A\subseteq N, C^1\mu A(x-\eta)<C^1\mu A(y)\}.$$

We have $\emptyset\in\Omega$ and $N\in\Omega$. We can then replace $C^1\mu$ by $C^1\mu$ in the explanation to be provided. In order to simplify the explanation, we therefore search for the coalitions AEQ of smallest cardinality. In a similar manner to what was set forth in lemma 2, we have the following result:

Lemma 5: Let $A\in\Omega$ be minimal. Then necessarily, $x_i-y_i<\eta$ for all $i\in A$ such that $v_i>1/n$, and $x_i-y_i>\eta$ for all $i\in A$ such that $v_i<1/n$.

Let $l^+\eta=\{i\in A, x_i-y_i>\eta\}$ and $l^-_\eta=\{i\in A, x_i-y_i<n\}$. In order to provide an explanation that is simple to comprehend, we wish, in accordance with lemma 2, to mention only the important criteria belonging to $l^-$ and the unimportant criteria belonging to $l^+$. According to lemma 5, if $i\in A$ is important ($v_i>1/n$), then $i\in l^-_\eta$. As $\eta<0$, this implies that $i\in l^-$. On the other hand, if i is unimportant, we do not necessarily have $i\in l^+$. We therefore have the following cases:

If $A\cap l^-_\eta\neq\emptyset$, then the explanation to be provided is:
  "y is preferred to x since y is on average better than x. This has been amplified by the fact that y is better than x with regard to the criteria $A\cap l^-_\eta$ which are important, whereas y is less good than x with regard to the criteria $A\cap l^+$ which are unimportant."

If $A\cap l^-_\eta=\emptyset$ and $A\cap l^+\neq\emptyset$, then the explanation to be provided is:
  "y is preferred to x since the criteria $A\cap l^+$ with regard to which x is better than y are unimportant, and do not compensate for the fact that y is on average better than x with regard to the other criteria."

If $A\cap l^-_\eta=\emptyset$ and $A\cap l^+=\emptyset$, then $A\subseteq l^+_\eta/l^+$. The use of the criteria of A would provide an unintuitive explanation. Another procedure must be used here. For this purpose we can use the alternative procedure described later for generating arguments for the explanation of a comparison between two alternatives.

Subcase 3b: $S(x)-S(y)<<C^1\mu(x)-C^1\mu(y)<0$

When $S(x)\leq S(y)$ and $C^1\mu(x)<C^1\mu(y)$ and $S(x)-S(y)<(1+\tau_1)(C^1\mu(x)-C^1\mu(y))$, the decision is less clear-cut with the Shapley operator than with the arithmetic mean. We wish to explain this. Let $\eta=[C^1\mu(x)-C^1\mu(y))+(S(x)-S(y))]/2$. We have $\eta<0$. We want to explain by using the principles developed in the case where $C^1\mu(x)-C^1\mu(y)$ but $S(x)\geq S(y)$, why $C^1\mu(x)-C^1\mu(y)>r$ and $(S(x)-S(y))<\eta$. In the same vein as what was done in the case where $C^1\mu(x)-C^1\mu(y)$ but $S(x)\geq S(y)$, we have:

$$\Omega=\{A\subseteq N, C^1\mu A(y)<C^1\mu A(x-\eta)\}.$$

We have $\emptyset\in\Omega$ and $N\in\Omega$. We can then replace $C^1\mu$ by $C^1\mu A$ in the explanation to be provided. In order to simplify the explanation, we therefore search for the coalitions $A\in\Omega$ of smallest cardinality. In a similar manner to what was set forth in lemma 2, we have the following result:

Lemma 6: Let $A\in\Omega$ be minimal. Then necessarily, $x_i-y_i>\eta$ for all $i\in A$ such that $v_i>1/n$, and $x_i-y_i<rl$ for all $i\in A$ such that $vi<1/n$.

Let $l^+_\eta=\{i\in A, x_i-y_i<\eta\}$ and $l^-_\eta=\{i\in A, x_i-y_i>\eta\}$. We proceed roughly speaking as in the previous section:

If $A\subset l^+_\eta\backslash l^+$, then at least one of the two sets $A\cap l^-_\eta$ where $A\cap l^+$ is nonempty. In the explanation, we drop the indices belonging to $l^+_\eta\backslash l^+$. The explanation to be provided is:
  "y is preferred to x since y is on average better than x. This has been partially attenuated by the fact that x is better than y with regard to the criteria $A\cap l^+$ which are important, whereas y is better than x with regard to the criteria $A\cap l^-_\eta$ which are unimportant."

If $A\subset l^+_\eta\backslash l^+$, the use of the criteria of A would provide an unintuitive explanation. Another procedure must be used here. We can use for this purpose the alternative procedure described later for generating arguments for the explanation of a comparison between two alternatives.

Subcase 3c: $C^1\mu(x)-C^1\mu(y)\approx S(x)-S(y)<0$

When $C^1\mu(x)\geq C^1\mu(y)$, or $C^1\mu(x)-C^1\mu(y)<\tau_2(C^2\mu(x)-C^2\mu(y))$ or $C^2\mu(x)-C^2\mu(y)\tau_4(C^1\mu(y))S(x)\leq S(y)$ and $C^1\mu(x)<C^1\mu(y)$ and $-C^1\mu(y)<(1+\tau_1)(S(x)-S(y))$, then the decision is as clear-cut with the Shapley operator as with the mean. Here we can no longer use the procedure consisting in basing the explanation on a comparison with the arithmetic mean. The solution is then to replace the arithmetic mean by a reference aggregation function. This will be another weighted sum. We denote by $\phi$ the new reference weights. $\phi_i=\alpha$ if $x_i>y_i$, $\phi_i=\beta$ if $x_i<y_i$ and $\phi_i=1/n$ if $x_i=y_i$, let $\eta=C^1\mu(x)-C^1\mu(y)$. We write:

$$n^+=|l^+|,\ n^-=|l^-|,\ |xy|^*=[\Sigma_{i\in l+}|x_i-y_i|]/n^+\ \text{and}\ |xy|^-=[\Sigma_{i\in l-}|x_i-y_i|]/n^-.$$

We write $S\phi(x)=\Sigma_i x_i$. We search for $\alpha$ and $\beta$ such that $\Sigma_i\phi_i=1$ and $S\phi(x)-S\phi(y)=-\eta$. This gives:

$$n^+\alpha+n^-\beta=(n^++n^-)/n\ \text{and}\ n^+|xy|^+\alpha-n^-|xy|^-\beta=-\eta.$$

We obtain:

$$\alpha=[-\eta+|xy|^-(n^++n^-)/n]/[n^+(|xy|^++|xy|^-)]$$

$$\beta=[\eta+|xy|^-(n^++n^-)/n]/[n^+(|xy|^++|xy|^-)]$$

We have the following result:
Lemma 7: We have $\alpha$, $\beta\in[0, 1]$ if and only if $|xy|^+(n^++n^-)/n\geq-\eta$. For $A\subseteq N$, we define $C^1\mu\phi A(x)=\Sigma_{i\in A} v_i x_i+\Sigma_{i\notin A}\phi_i x_i$. In the same vein as what was done in the case where $C^1\mu(x)<C^1\mu(y)$ but $S(x)\geq S(y)$, we have:

$$\Omega\{A\subseteq N,\ C^1\mu A(x)<C^1\mu A(y)\}.$$

We have $\emptyset \notin \Omega$ and $N \in \Omega$ since $C^1\mu(x)-C^1\mu(y)=\eta<0$ and $S\phi(x)-S\phi(y)=-\eta>0$.

We can then replace $C^1\mu$ by $C^1\mu A$ in the explanation to be provided. In order to simplify the explanation, we therefore search for the coalitions $A \in \Omega$ of smallest cardinality. In a manner similar to that set forth in lemma 2, we have the following result:

Lemma 8: Let $A \in \Omega$ be minimal. Then necessarily, $x_i<y_i$ for all $i \in A$ such that $v_i>\beta$, and $x_i>y_i$ for all $i \in A$ such that $v_i<\alpha$.

In order to be able to interpret the relations $v_i>\beta$ and $v_i<\alpha$, we have the following lemma:

Lemma 9: Under the condition $S(x)-S(y)<-\eta$, we have $\alpha>1/n$ and $\beta<1/n$.

As $S(x)-S(y)<0-\eta$, we have $\alpha>1/n$ and $\beta<1/n$. Thus, the criteria satisfying $v_i>\beta$ are not necessarily important ($v_i>1/n$). Likewise, the criteria satisfying $v_i>\alpha$ are not necessarily unimportant ($v_i>1/n$). In order to provide a explanation that is simple to comprehend, we wish, in accordance with lemma 2, to mention only the important criteria belonging to $I^-$ and the unimportant criteria belonging to $I^+$. We therefore put:

$$D^+=\{i \in N, v_i>1/n\} \text{ and } D^-=\{i \in N, v_i<1/n\}.$$

We therefore have the following cases:

If $A \cap I^- \cap D \neq \emptyset$, then the explanation to be provided is:
"y is preferred to x since y is better than x with regard to the criteria $A \cap I^- \cap D^+$ which are important, whereas y is less good than x with regard to the criteria $A \cap I^+ \cap D^-$ which are unimportant."

If, $A \cap I^- \cap D^+=\emptyset$ and $A \cap I^+ \cap D^- \neq \emptyset$, then the explanation to be provided is:
"y is preferred to x since the criteria $A \cap I^+ \cap D^-$ with regard to which x is better than y are unimportant, and do not compensate for the fact that y is on average better than x with regard to the other criteria".

If $A \cap I^- \cap D^+=\emptyset$ and $A \cap I^+ \cap D^-=\emptyset$, then the use of the criteria of A would provide an unintuitive explanation. Another procedure must be used here. We can use for this purpose the alternative procedure described later for generating arguments for the explanation of a comparison between two alternatives.

Subcase 4a

We find ourselves in one of the following two cases:

$$S(x)-S(y)<C^2\mu(x)-C^2\mu(y)<0 \text{ or } C^2\mu(x)-C^2\mu(y)<0<$$

$S(x)-S(y)$. We define:

$$\eta=[(C^2\mu(x)-C^2\mu(y))+(S(x)-S(y))]/2 \text{ if } S(x)-S(y)<C^2\mu(x)-C^2\mu(y)<0$$

$$\eta=0 \text{ if } C^2\mu(x)-C^2\mu(y)<0<S(x)-S(y).$$

and $$\epsilon=-1 \text{ if } S(x)-S(y)<C^2\mu(x)-C^2\mu(y)<0$$

$$\epsilon=-1 \text{ if } C^2C\mu(x)-C^2\mu(y)<0<S(x)-S(y).$$

With this notation, we have: $\epsilon(C^2\mu(x-n)-C^2\mu(y))<0$ and $\epsilon(S(x-r)-S(y)))>0$. We therefore wish to explain this difference of sign. In a manner similar to what was just set forth above for subcase 3a, we define:

$$\Omega^*=\{A \times A^* \subseteq N \times N, \epsilon(C^2\mu,A,A(x-\eta)-C^2\mu,A,A(y))<0 \text{ et } \{i,j\} \in A^+ \not\subset^{i,j \in A}\}.$$

We have $(\emptyset,\emptyset) \in \Omega$ and $(N,N^*) \in \Omega^*$. As previously, we are interested in the minimal elements of $\Omega^*$. We have similar properties to those of lemma 4. The explanation to be provided is therefore similar to what was done in the account of the case where $C^2\mu(x)<C^2\mu(y)$ but $C^1\mu(x)>C^1\mu(y)$ and $S(x)>S(y)$.

We assume that $A^* \cap D^{*'+}=\{(i_1,j_1) \ldots (i_p,j_p)\}$ and $A^* \cap D^{*'-}=\{(k_1,l_1), \ldots, (k_q,l_q)\}$ avec $x_{i1}>x_{j1}, \ldots, x_{ip}>x_{jp}$ and $y_{k1}<y_{l1}, \ldots, y_{kq}<y_{lq}$.

When $E=1$, the explanation is as follows:

"Although y is on average less good than x, y is nevertheless preferred to x since the score of x with regard to the criterion $i_1$ is penalised by a worse score according to criterion $j_1$ (the criteria $i_1$ and $j_1$ must both be satisfied), ..., the score of x with regard to the criterion $i_p$ is penalised by a worse score according to criterion $j_p$ (the criteria $i_p$ and $j_p$ must both be satisfied), the score of y with regard to criterion $k_l$ has been redeemed by a better score with regard to criterion $l_l$ (it suffices to satisfy one of two criteria $k_l$ or $l_l$) ..., the score of y with regard to the criterion $k_q$ has been redeemed by a better score with regard to criterion $l_q$ (it suffices to satisfy one of the two criteria $k_q$ or $l_q$), x is less good than y with regard to the criteria $A \cap I^- \cap D^+$ which are important, and x is better than y with regard to the criteria $A \cap I^+ \cap D^+$ which are unimportant."

When $\epsilon=-1$, the explanation is as follows:

"y is preferred to x since y is on average better than x. This has been partially compensated for by the fact that the score of x with regard to criterion $i_l$ is penalised by a worse score according to criterion $j_l$ (the criteria $i_l$ and $j_l$ must both be satisfied), ..., the score of x with regard to criterion $i_p$ is penalised by a worse score according to criterion $j_p$ (the criteria $i_p$ and $j_p$ must both be satisfied), the score of y with regard to criterion $k_l$ has been redeemed by a better score with regard to criterion $l_l$ (it suffices to satisfy one of two criteria $k_l$ or $l_l$), ..., the score of y with regard to the criterion $k_q$ has been deemed by a better score with regard to criterion $l_q$ (it suffices to satisfy one of the two criteria $k_q$ or $l_q$), x is less good than y with regard to the criteria $A \cap I^- \cap D^+$ which are important, and x is better than y with regard to the criteria $A \cap I^+ \cap D^+$ which are unimportant."

Subcase 4b:

We find ourselves in one of the following three cases: $C^1\mu(x)-C^1\mu(y)<C^2\mu(x)-C^2\mu(y)<0$, $C^2\mu(x)-C^2\mu(y)<C^1\mu(x)-C^1\mu(y)<0$ or $C^2\mu(x)-C^2\mu(y)<0<C^1\mu(x)-C^1\mu(y)$.

We limit ourselves here to explaining the comparison between $C^1\mu$ and $C^2\mu$. We define:

$$\eta=[(C^2\mu(x)-C^2\mu(y))+(C^1\mu(x)-C^1\mu(y))]/2 \text{ si } C^1\mu(x)-C^1\mu(y) \leq 0$$

$\eta=0$ otherwise.

and:

$$\epsilon=-1 \text{ if } C^1\mu(x)-C^1\mu(y)<C^2\mu(x)-C^2\mu(y)$$

$\epsilon=1$ otherwise.

With this notation, we have:

$$\epsilon(C^2\mu((x-\eta)-C^2\mu(y))<0 \text{ and } \epsilon(C^1\mu(x-n)-C^1\mu(x-\eta)-C^1\mu(y)))>0.$$

We therefore want to explain this difference of sign. In a similar manner to what was set forth hereinabove for the subcase 3c, we define:

$$C^2\mu,A(x)=\rho_{i \in N} V_i X_i-\Sigma_{\{i,j\} \in A}*|x_i-x_j|\cdot I_{ij}/2.$$

All the coefficients of importance are kept. We therefore seek to determine the interaction terms from which the decision taken stems. As all the terms of importance are present, we have no problem of monotonicity of the fuzzy measure (cf. lemma 3). Let:

$$\Omega^*=\{A^* \subseteq N^*, \epsilon(C^2\mu,A^*(x-\eta)-C^2\mu,A^*(y))<0\}.$$

We have $\emptyset \notin \Omega^*$ and $N^* \in \Omega^*$. As previously, we are interested in the minimal elements of $\Omega^*$. We have similar properties to those of lemma 4. The explanation to be provided is therefore similar to what was done in the case where $C^2\mu(x)<C^2\mu(y)$ but $C^1\mu(x)>C^1\mu(y)$ and $S(x)>S(y)$. We assume that $A^*\cap D^{*'+}=\{i_1,j_1)f,\ldots,(i_p,j_p\}$ and $A\cap D^{*'-}=\{(k_1,l_1),\ldots,(k_q,l_q)\}$ with $x_{i1}>x_{j1},\ldots |x_{ip}>x_{jp}$ and $y_{k1}<y_{l1},\ldots,y_{kq}<y_{lq}$.

When $C^1\mu(x)-C^1\mu(y)<C^2\mu(x)-C^2\mu(y)<0$, we must explain why the 2-additive model gives a less clear-cut decision than $C^1\mu$. This gives the following explanation:

"y is preferred to x since . . . This has been partially compensated for by the fact that the score of x with regard to criterion $i_1$ is penalised by a worse score according to criterion $j_i$ (the criteria $i_1$ and $j_1$ must both be satisfied), . . . , the score of x with regard to criterion $i_p$ is penalised by a worse score according to criterion $j_p$ (the criteria $i_p$ and $j_p$ must both be satisfied), the score of y with regard to criterion $k_1$ has been redeemed by a better score with regard to criterion $l_1$ (it suffices to satisfy one of the two criteria $k_1$ or $l_1$), . . . , the score of y with regard to criterion $k_q$ has been redeemed by a better score with regard to criterion $l_q$ (it suffices to satisfy one of the two criteria $k_q$ or $l_q$)."

where " . . . " contains the explanation of the relation $C^1\mu(x)-C^1\mu(y)<0$.

When $C^2\mu(x)-C^2\mu(y)<C^1\mu(x)-C^1\mu(y)<0$, we begin by explaining why the 2-additive model gives a more clear-cut decision than $C^1\mu$. This gives the following explanation:

"y is preferred to x since the score of x with regard to criterion $i_1$ is penalised by a worse score according to criterion $j_1$ (the criteria $i_1$ and $j_1$ must both be satisfied), . . . , the score of x with regard to criterion $i_p$ is penalised by a worse score according to criterion $j_p$ (the criteria $i_p$ and $j_p$ must both be satisfied), the score of y with regard to criterion $k_1$ has been redeemed by a better score with regard to criterion $l_1$ (it suffices to satisfy one of the two criteria $k_1$ or $l_1$), . . . , the score of y with regard to the criterion $k_q$ has been redeemed by a better score with regard to criterion $l_q$ (it suffices to satisfy one of the two criteria $k_q$ or $l_q$). This has been accentuated by the fact that . . . "

where " . . . " contains the explanation of the relation $C^1\mu(x)-C^1\mu(y)<0$.

When $C^2\mu(x)-C^2\mu(y)<0<C^1\mu(x)-C^1\mu(y)$, we must explain why the 2-additive model gives a more clear-cut decision than $C^1\mu$. This gives the following explanation:

"y is preferred to x since the score of x with regard to the criterion $l_1$ is penalised by a worse score according to criterion $j_1$ (the criteria $l_1$ and $j_1$ must both be satisfied), . . . , the score of x with regard to criterion $i_p$ is penalised by a worse score according to criterion $j_p$ (the criteria $i_p$ and $j_p$ must both be satisfied), the score of y with regard to criterion $k_1$ has been redeemed by a better score with regard to criterion $l_1$ (it suffices to satisfy one of the two criteria $k_1$ or $l_1$), . . . , the score of y with regard to criterion $k_q$ has been redeemed by a better score with regard to criterion $l_q$ (it suffices to satisfy one of the two criteria $k_q$ or $l_q$). This has been partially attenuated by the fact that . . . "

Where " . . . " contains the explanation of the relation $C^1\mu(x)-C^1\mu(y)>0$ Alternative Procedure for Generating Arguments for the Explanation of a Comparison Between Two Alternatives:

We assume that we desire to explain why $C^1\mu(x)-C^1\mu(y)$.

We write:

$$C^1\mu(x) - C^1\mu(y) = \sum_{\substack{l \in t' \\ >0}} v_i(x_i - y_i) + \sum_{\substack{l \in t' \\ <0}} v_i(x_i - y_i)$$

We want to determine the most important phenomena in $C^1\mu(x)-C^1\mu(y)$. From the countable point of view, these are the indices i for which $v_i|x_i-y_i|$ is large. Let therefore $n^\pm=\|\pm|$, and $o^\pm$ the permutation $1\,\sigma^\pm\colon\{1,\ldots,n\}\to|^\pm$:

We seek $i^+\in\{1,\ldots,n^+\}$ and $i^-\in\{1,\ldots,n^-\}$ which satisfy the following requirements:

We want the phenomena retained to contain in absolute value most of the existing phenomena. We therefore want:

$$\rho = \frac{\sum_{i=1}^{i'} v_{\sigma'(i)}|x_{\sigma'(i)} - y_{\sigma'(i)}| + \sum_{i=1}^{i'} v_{\sigma'(i)}|x_{\sigma'(i)} - y_{\sigma'(i)}|}{\sum_{i=1}^{n} v_i|x_i - y_i|}$$

to be "large". The term large is governed by the membership function F.

We want the mean value of the absolute value of the phenomena retained not to be negligible relative to the most important phenomenon. We therefore want:

$$\psi = \frac{1}{\max(v_{\sigma'(i)}|x_{\sigma'(i)} - y_{\sigma'(i)}|, v_{\sigma'(i)}|x_{\sigma'(i)} - y_{\sigma'(i)}|)} \times \frac{\sum_{i=1}^{i'} v_{\sigma'(i)}|x_{\sigma'(i)} - y_{\sigma'(i)}| + \sum_{i=1}^{i''} v_{\sigma'(i)}|x_{\sigma'(i)} - y_{\sigma'(i)}|}{i^+ + i^-}$$

to be "large". The term large is governed by the membership function G.

We don't want any positive phenomenon retained to be unnecessary. Stated otherwise, the ratio of the least important phenomenon retained to the most important one should not be too small. We therefore want:

$$\eta^\pm = \frac{v_{\sigma^*(i^*)}|x_{\sigma^*(i^*)} - y_{\sigma^*(i^*)}|}{v_{\sigma^*(i)}|x_{\sigma^*(i)} - y_{\sigma^*(i)}|}$$

to be "large". The term large is governed by the membership function $H^\pm$.

We don't want to omit an important positive phenomenon: the ratio of the most important phenomenon disregarded to the most important phenomenon must therefore be low. We therefore want:

$$\theta^3 = \frac{v(?)\,|x(?) - y(?)|}{v(?)\,|x(?) - y(?)|}$$

(?) indicates text missing or illegible when filed to be "small". The term small is governed by the membership function $K^\pm$.

We want the decision taken to be approximately the same. Consequently, the sum of the phenomena retained should be fairly close to $S_\mu(x) < S_\mu(y)$. We want:

$$\phi = \frac{1}{|S_v(x) - S_v(y)|} \left[ \sum_{i=1}^{i'} v(?)(x(?) - y(?)) + \sum_{i=1}^{i'} v(?)(x(?) - y(?)) - (S_v(x) - S_v(y)) \right]$$

(?) indicates text missing or illegible when filed to be as close as possible to 0. This is conveyed by the membership function L.

We seek $i^* \in \{1, \ldots, n^+\}$ and $i^- \in \{1, \ldots, n^-\}$ which maximises:

$$F(\rho)^\wedge G(\psi)^\wedge H^+(\eta^+)^\wedge H^-(\eta^-)^\wedge K^+(\theta^+)^\wedge K^-(\theta^-)^\wedge L(\phi)$$

we can generate an explanation of the kind:

"y is preferred to x since y is better than x with regard to the criteria $\sigma(1), \ldots, \sigma^-(i^-)$ which have contributed greatly to the decision taken."

If $\eta^+/(\eta^- + \eta^+)$ is fairly large, then the terms $\sigma(1), \ldots, \sigma^+(i^+)$ must be mentioned in the explanation. We therefore append the following line to the above text: "This has been partially compensated for by the fact that x is better than y with regard to the criteria $\sigma(1), \ldots, \sigma^+(i^+)$."

Arrangement of the Various Arguments.

As we have just seen, the global explanation can be framed as several points (for example, explain why $M^i_k(x,y) < 0$ whereas $M^j_k(x,y) \geq 0$, then explain why $M^j_k(x,y) \geq 0$). Each point may make reference to several arguments. The problem which arises is then firstly to organize the arguments in the right order (so as to be logical and comprehensible to a user), and thereafter to construct the general explanation by putting the right linking words between the various arguments.

For this purpose, we store the arguments one after another in a stack. For each argument, we additionally indicate the argument from which it arises, and whether it runs in the same sense or counter to this argument.

We wish to compare two actions X and Y. We assume that we obtain $S(x) - S(y) = 0.08$, $C^1\mu(x) - C^1\mu(y) = 0.06$ and $C^2\mu(x) - C^2\mu(y) = -0.11$. We therefore have globally Y>X. By applying the principles given previously, the explanation to be provided is organized in the following manner:

We begin by explaining why $C^2\mu(x) - C^2\mu(Y) < 0$ whereas $C^1\mu(x) - C^1\mu(y) > 0$. We then find ourselves in case 4b. This gives, for example:

"Y is preferred to X since the score of X with regard to criterion 0 is penalised by a worse score with regard to criterion 1 (criteria 0 and 1 must both be satisfied)."

We must then explain why $C^1\mu(X) - C^1\mu(Y) > 0$. This point will therefore moderate the previous one. As $S(X) - S(Y) > C^1\mu(X) - C^1\mu(Y) > 0$, we are then in case 3b. The argument is therefore composed of two points:

The first argument indicates that $S(X) - S(Y) > 0$: "X is on average better than Y."

The second argument moderates the previous one, and explains why the decision taken with the Shapley operator is less clear-cut than with the arithmetic mean:

"X is better than Y with regard to criterion 4 which is unimportant".

We see that the third argument moderates the second argument which itself moderates the first. Consequently, the third in fact complements the first argument.

Thus, the global explanation is based on these three arguments in the order given previously, we obtain: "Y is preferred to X since the score of X with regard to criterion 0 is penalised by a worse score with regard to criterion 1 (criteria 0 and 1 must both be satisfied). This has been partially compensated for by the fact that X is on average better than Y. This has been partially attenuated by the fact that X is better than Y with regard to criterion 4 which is unimportant."

There is a risk that the user may be misled by the real meaning of the last argument. We do not know clearly which argument the last one attenuates. In order to clarify the explanations, the solution is then to promote the last argument to second position, that is to say to begin with the arguments which go in the same sense as the first argument, and to end with the others. This gives in the example taken here:

"Y is preferred to X since the score of X with regard to criterion 0 is penalised by a worse score with regard to criterion 1 (criteria 0 and 1 must both be satisfied). This has been amplified by the fact that X is better than Y with regard to criterion 4 which is unimportant. Nevertheless, this has been partially attenuated by the fact that X is on average better than Y."

For each argument of the stack we determine whether it complements or moderates the main argument. We then reorder the stack, putting in first place the arguments which complement the main argument. The arguments are then generated in this order, beginning the arguments which supplement with "This has been amplified by the fact that", beginning the first argument which moderates the main argument with "Nevertheless, this has been partially attenuated by the fact that", and beginning the other arguments which moderate the main argument with "Moreover".

Examples of Explanations Generated.

We will now set forth examples of explanations generated for the two problems cited hereinabove in the account of the general principle of the method of the invention. To do this, we start from a multi-criterion aggregation example.

Figure 3:
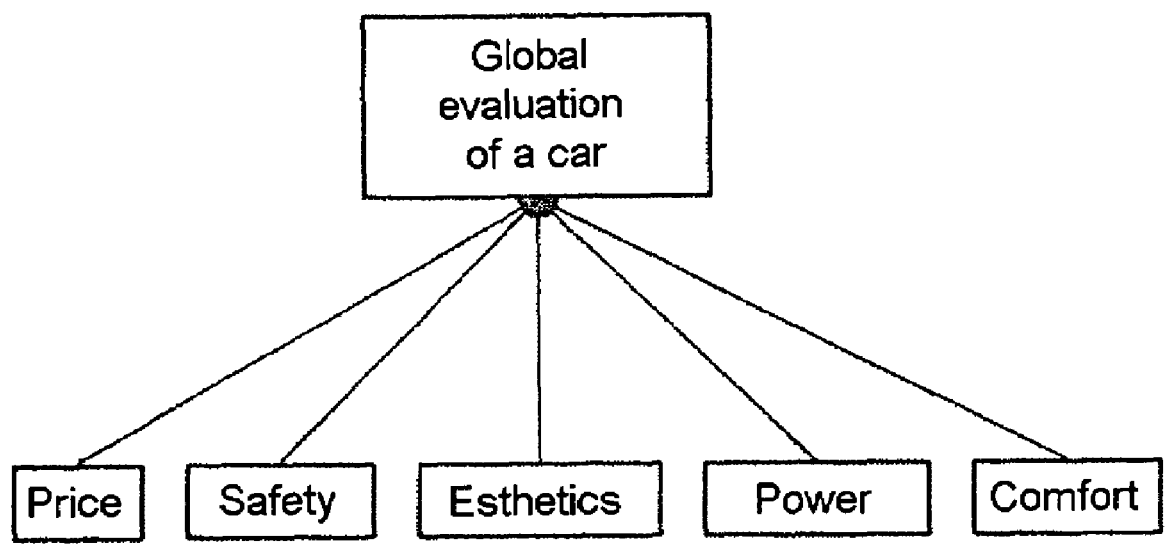
FIG. 3 is a simplified chart for describing an exemplary application package to which the invention refers.

We consider the simplified example of the evaluation of a car according to five criteria: Price (Pri); Safety (Saf); Esthetics (Est); Power (Pow) and Comfort (Com), as represented in FIG. 3.

By way of example, we consider the following indices of importance:

Pri: 0.367; Saf: 0.216; Est: 0.121; Pow: 0.254; Com: 0.042

The nonzero interaction indices are given below:

(Pri,Saf): 0.254; (Pri,Est): 0.085; (Pri,Pow): 0.253; (Saf, Pow): 0.151; (Saf,Com): 0.027; (Est,Pow); (Est,Com): 0.058

We will set forth the explanations of the comparison between two alternatives and we will give here a few examples of texts generated with the second solution (set forth hereinabove), in all the possible cases.

Case 1 of the Second Solution:

X=(Pri=0.93; Saf=0.98; Est=0.76; Pow=0.21; Com=0.38) and Y=(Pri=0.22; Saf=0.61; Est=0.39; Pow=0.20; Com=0.27). We have Y<X.

The explanation generated is as follows:

"X is preferred to Y since ALL the scores of X are better than those of Y."

Case 2 of the second solution:
X=(Pri=0.76; Saf=0.71; Est=0.59; Pow=0.91; Com=0.80) and Y=(Pri=0.38; Saf=0.67; Est=0.89; Pow=0.21; Com=0.39). We have Y<X.

The explanation generated is as follows:

"X is preferred to Y since the scores of X are on average better than those of Y."

Case 3a of the Second Solution:
X=(Pri=0.95; Saf=0.66; Est=0.59; Pow=0.71; Com=0.56) and Y=(Pri=0.28; Saf=0.66; Est=0.68; Pow=0.32; Com=0.90). We have Y<X.

The explanation generated is as follows:

"X is preferred to Y since X is on average better than Y. This has been amplified by the fact that X is better than Y as regards the PRI criterion which is important, whereas Y is better than X as regards the COM criterion which is unimportant."

Case 3b of the Second Solution:
X=(Pri=0.93; Saf=0.36; Est=0.97; Pow=0.39; Com=0.99) and Y=(Pri=0.78; Saf=0.27; Est=0.40; Pow=0.59; Com=0.49). We have Y<X.

The explanation generated is as follows:

"X is preferred to Y since X is on average better than Y. This has been partially attenuated by the fact that X is better than Y as regards the EST, COM criteria which are unimportant."

Case 3c of the Second Solution:
X=(Pri=0.56; Saf=0.11; Est=0.92; Pow=0.42; Com=0.16) and Y=(Pri=0.54; Saf=0.53; Est=0.30; Pow=0.75; Com=0.65). We have X<Y.

The explanation generated is as follows:

"Y is preferred to X since the EST criterion for which X is better than Y is unimportant, and does not compensate for the fact that Y is on average better than X with regard to the other criteria."

Case 3d of the Second Solution:
X=(Pri=0.28; Saf=0.75; Est=0.24; Pow=0.50; Com=0.51) and Y=(Pri=0.27; Saf=0.51; Est=0.44; Pow=0.35; Com=0.92). We have Y<X.

The explanation generated is as follows:

X is preferred to Y since the COM criterion for which Y is better than X is unimportant, and does not compensate for the fact that X is on average better than Y with regard to the other criteria.

If we have:
X=(Pri=0.61; Saf=0.43; Est=0.96; Pow=0.01; Com=0.60) and Y=(Pri=0.86; Saf=0.29; Est=0.23; Pow=0.33; Com=0.30). We obtain X<Y.

The explanation generated is as follows:

"Although Y is on average less good than X, Y is nevertheless preferred to X since Y is better than X with regard to the PRI criterion which is important, whereas X is better than Y with regard to the EST, COM criteria which are unimportant."

Case 4a of the Second Solution:
X=(Pri=0.99; Saf=0.83; Est=0.97; Pow=0.16; Com=0.64) and Y=(Pri=0.71; Saf=0.65; Est=0.36; Pow=0.90; Com=0.18). We have X<Y.

The explanation generated is as follows:

"Although Y is on average less good than X, Y is nevertheless preferred to X since the score of X with regard to the PRI criterion is penalised by a poorer score with regard to the POW criterion (the PRI and POW criterion must both be satisfied), the score of X with regard to the SAF criterion is penalised by a poorer score with regard to the POW criterion (the SAF and POW criteria must both be satisfied), Y is better than X with regard to the POW criterion which is important and X is better than Y with regard to the COM criterion which is unimportant."

If we have:
X=(Pri=0.27; Saf=0.47; Est=0.70; Pow=0.97; Com=0.51) and Y=(Pri=0.51; Saf=0.24; Est=0.69; Pow=0.48; Com=0.01). We obtain Y<X.

The explanation generated is as follows:

"X is preferred to Y since X is on average better than Y. This has been partially attenuated by the fact that the score of X with regard to the POW criterion is penalised by a poorer score with regard to the PRI criterion (the POW and PRI criteria must both be satisfied) and Y is better than X with regard to the PRI criterion which is important."

Case 4b of the Second Solution:
X=(Pri=0.33; Saf=0.60; Est=0.25; Pow=0.79; Com=0.24) and Y=(Pri=0.27; Saf=0.46; Est=0.93; Pow=0.57; Com=0.63). We have X<Y.

The explanation generated is as follows:

"Y is preferred to X since the score of X with regard to the SAF criterion is penalised by a poorer score with regard to the PRI criterion (the SAF and PRI criteria must both be satisfied). This has been partially attenuated by the fact that X is better than Y with regard to the PRI, POW criteria which are important, whereas Y is better than X with regard to the EST, COM criteria which are unimportant."

If we have:
X=(Pri=0.96; Saf=0.01; Est=0.49; Pow=0.16; Com=0.32) and Y=(Pri=0.27; Saf=0.17; Est=0.26; Pow=0.08; Com=0.43). We obtain Y<X.

The explanation generated is as follows: "X is preferred to Y since X is on average better than Y. This has been amplified by the fact that X is better than Y with regard to the PRI criteria which is important. Nevertheless, this has been partially attenuated by the fact that the score of X with regard to the PRI criterion is penalised by a poorer score with regard to the SAF criterion (the PRI and SAF criteria must both be satisfied)."

Explanations of the Global Score of x.

We will here set forth a few examples of texts generated from the explanation of the global score of an alternative X based on the second procedure.

If: X=(Pri=1; Saf=1; Est=1; Pow=0.97; Com=1). Global score=0.97, the explanation generated is as follows: "X is VERY GOOD since ALL the scores of X are VERY GOOD.

If:
X=(Pri=0.98; Saf=0.92; Est=0.69; Pow=0.63; Com=0.02). Global score=0.68, the explanation generated is as follows:

"X is GOOD since the Com criterion for which X is not GOOD is unimportant, and does not compensate for the fact that X is on average GOOD with regard to the other criteria.

X is not EXCELLENT since the score of X with regard to the Pri criterion is penalised by a poorer score with regard to the Pow criterion (the Pri and Pow criteria must both be satisfied). On the other hand, the scores according to the various criteria more or less compensate for one another."

If:
X=(Pri=0.72; Saf=0.56; Est=0.88; Pow=0.16; Com=0.01).

Global score=0.35, the explanation generated is as follows:

"Although X is not on average POOR, X is nevertheless POOR since the score of X with regard to the Est criterion is penalised by a poorer score with regard to the Pow criterion (the Est and Pow criteria must both be satisfied), X is POOR with regard to the Pow criterion which is important and X is not POOR with regard to the Est criterion which is unimportant.

X is not DEPLORABLE since X is not DEPLORABLE with regard to the Pri criterion which is important."

If:

X=(Pri=0.72; Saf=0.07; Est=0.75; Pow=0.29; Com=0.74). Global score=0.30, the explanation generated is as follows:

"Although X is not on average POOR, X is nevertheless POOR since the score of X with regard to the Pri criterion is penalised by a poorer score with regard to the Saf criterion (the Pri and Saf criteria must both be satisfied), X is POOR with regard to the Saf criterion which is important and X is not POOR with regard to the Est, Com criteria which are unimportant. X is not DEPLORABLE since X is not DEPLORABLE with regard to the Pri criterion which is important."

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of generating explanations for explaining to a user a decision taken with the aid of a compensatory multi-criterion aggregation model for a given application, according to which method a decisional model is established for the application considered, which decisional model is described by a certain number of phenomena and reproduces a determined expert opinion, wherein said decisional model is a single compensatory multi-criterion aggregation model, wherein no reference is made in the explanation to the specificities of the compensatory multi-criterion aggregation model if the decision taken had been the same when replacing the aggregation model by any other close model, wherein if such is not the case, the aggregation model is simplified by taking into account fewer and fewer phenomena as long as the decision taken remains the same, and wherein an explanation based solely on the compensation phenomena present in the simplest model previously determined is returned to the user.

2. The method as claimed in one of claim 1, wherein the decision chooses one alternative out of two, that the model is evaluated for these two alternatives, that the decision will be to choose the alternative of higher score, and that this decision is explained.

3. The method as claimed in claim 1, wherein the explanation to be provided in respect of the simplified model is obtained by comparison with an even simpler aggregation model but which leads to a decision that does not comply with the single model.

4. The method as claimed in claim 3, wherein the aggregation model has several nested levels of simplification represented by a series of comparison functions $M^1, \ldots, M^p$ for comparing between the two alternatives, that the function $M^i$ comprises all the compensation phenomena present in $M^{i-1}$ plus other phenomena, that the function $M^p$ represents the comparison with the initial aggregation model and comprises the set of possible compensation phenomena, that the function $M^1$ comprises no compensation phenomenon specific to the aggregation model, that if $M^1$ provides the same decision as the aggregation model, the explanation to be provided makes no reference to the specificities of the aggregation model, that in the converse case the explanation is based on the function $M^q$ such that $M^q$ provides the same decision as the aggregation model and that the preceding comparison functions $M^1, \ldots, M^{q-1}$ provide the opposite decision.

5. The method as claimed in claim 4, wherein the explanation of the decision taken by the comparison function $M^q$ is effected by comparison with a comparison function $M^j$ with j<q, that is more simplified but provides a decision that does not comply with the single model, that the compensation phenomena used in the explanation are those contained in $M^q$ but not contained in $M^j$, and that to determine from among these phenomena those which have actually counted in the decision taken, behaviors are progressively appended to $M^j$ until the decision taken is in accordance with the single model.

6. The method as claimed in claim 5, wherein the aggregation model corresponds to a weighted sum or a 2-additive Choquet integral.

7. The method as claimed in claim 6, wherein there are four comparison functions, that the first comparison function $M^1$ indicates that an alternative is preferred to a second if the first alternative is better than the second according to all criteria, that the second comparison function $M^2$ corresponds to the comparison by an arithmetic mean, that the third comparison function $M^3$ has only the phenomena of importance of the criteria, that the fourth comparison function $M^4$ has the whole set of phenomena of importance and of interaction between criteria, that if the first comparison function giving the decision in accordance with the single model is $M^3$, then one determines the phenomena to be put into the explanation by comparison with $M^2$, and that if the first comparison function giving the decision in accordance with the single model is $M^4$, then one determines the compensation phenomena to be included in the explanation by comparison with $M^2$.

8. The method as claimed in claim 1, wherein the decision to be taken evaluates an alternative, that the model is evaluated for this alternative and that this evaluation is explained.

9. The method as claimed in claim 8, wherein the whole set of evaluations is split into 2m+1 ordered levels $N_{-m}, \ldots, N_0, \ldots, N_m$, that the level $N_{-m}$ is the worst, that the level $N_0$ is average, that is to say neither good nor bad, that $N_m$ is the best level, that each level is characterized by a minimum value and a maximum value, that the level $N_k$ corresponding to its evaluation by the model is determined for the alternative, that one explains why the alternative is preferred to an alternative whose values according to all criteria are equal to the minimum value of the level $N_k$ by applying the method as claimed in one of claims 2 to 7, and that one explains why the alternative is less well preferred to an alternative whose values according to all criteria are equal to the maximum value of the level $N_k$.

10. The method as claimed in claim 9, wherein k>0, that one indicates that the alternative is $N_k$" by applying the method as claimed in one of claims 2 to 7 to the comparison between the alternative and an alternative whose values according to all the criteria are equal to the minimum value of the level $N_k$, and that one indicates that the alternative is not $N_{k+1}$ to the comparison between the alternative and an alternative whose values according to all the criteria are equal to the maximum value of the level $N_k$.

11. The method as claimed in claim 9, wherein k<0, that one indicates that the alternative is $N_k$ to the comparison between the alternative and an alternative whose values according to all the criteria are equal to the maximum value of the level $N_k$, and that one indicates that "the alternative is not $N_{k-1}$" by applying the method as claimed in one of claims 2 to 7 to the comparison between the alternative and an alternative whose values according to all the criteria are equal to the minimum value of the level $N_k$.

12. The method as claimed in claim 9, wherein k=0, that one indicates that the alternative is not $N_1$ to the comparison between the alternative and an alternative whose value according to all the criteria are equal to the maximum value of the level $N_0$, and that one indicates that "the alternative is not $N_{-1}$" by applying the method as claimed in one of claims 2 to 7 to the comparison between the alternative and an alternative whose values according to all the criteria are equal to the minimum value of the level $N_0$.

* * * * *